United States Patent
Mendonsa et al.

(10) Patent No.: US 9,472,223 B1
(45) Date of Patent: Oct. 18, 2016

(54) MEDIA CERTIFICATION WITH DIFFERENT RECORDING WIDTHS

(71) Applicant: Seagate Technology LLC, Cupertino, CA (US)

(72) Inventors: Riyan Alex Mendonsa, Edina, MN (US); Wenzhong Zhu, Apple Valley, MN (US); Kaizhong Gao, North Oaks, MN (US); Edward C Gage, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/848,552

(22) Filed: Sep. 9, 2015

(51) Int. Cl.
*G11B 5/09* (2006.01)
*G11B 5/596* (2006.01)
*G11B 20/18* (2006.01)

(52) U.S. Cl.
CPC ....... *G11B 5/59638* (2013.01); *G11B 5/59688* (2013.01); *G11B 20/1816* (2013.01)

(58) Field of Classification Search
CPC .......... G11B 2220/90; G11B 2220/20; G11B 5/919; G11B 27/36; G11B 27/327; G11B 20/1426; G11B 5/09; G11B 5/59688; G11B 5/59638; G11B 5/012
USPC ............................ 360/22, 31, 39, 48, 75, 53
See application file for complete search history.

(56) References Cited

U.S. PATENT DOCUMENTS

| 5,333,140 | A | 7/1994 | Moraru et al. |
| 6,104,556 | A | 8/2000 | Schaenzer |
| 6,557,141 | B1 | 4/2003 | Gill et al. |
| 7,555,595 | B2 | 6/2009 | Miles |
| 7,768,736 | B2 | 8/2010 | Belmont et al. |
| 8,867,153 | B1 * | 10/2014 | Coker ............... G11B 5/012 360/31 |
| 2003/0123172 | A1 | 7/2003 | Zhu et al. |
| 2008/0239540 | A1 | 10/2008 | Belmont et al. |

* cited by examiner

Primary Examiner — Nabil Hindi
(74) Attorney, Agent, or Firm — Cesari & Reed, LLP; Kirk A. Cesari; Christian W. Best

(57) ABSTRACT

Systems and methods are disclosed to perform media certification with different recording widths, in accordance with certain embodiments of the present disclosure. An apparatus may be configured to record data using at least two selectable recording widths. In some embodiments, the recording width may be controlled by adjusting a laser current supplied to a laser emitter of a heat assisted magnetic recording (HAMR) device. Certification data may be recorded to a storage medium at a selected recording width, with wider widths reducing testing time and narrower widths reducing wear on write heads. In some embodiments, an apparatus may be configured to record servo data using a first recording width to a storage medium, and record certification data using a second recording width. The drive may record servo data and certification during a first disc rotation, and may record servo data and read certification data during a second disc rotation.

19 Claims, 16 Drawing Sheets

MEDIA CERTIFICATION WITH DIFFERENT RECORDING WIDTHS

SUMMARY

In certain embodiments, a method may comprise writing servo data at a first recording width with a multi-disc writer, servo data including data used by a servo control system to control a position of a recording head; writing first certification data at a second recording width different than the first recording width with the multi-disc writer, certification data including a bit pattern read to determine one or more locations of bad areas on a storage medium; installing the storage medium into a data storage device configured to record data at multiple recording widths; and selecting a third recording width from the multiple recording widths to record second certification data with the data storage device.

In certain embodiments, a system may comprise a multi-disc writer apparatus configured to write servo data using a first recording width during a first rotation of a storage medium, servo data including data used by a servo control system to control a position of a recording head; write first certification data during the first rotation using a second recording width different than the first recording width, certification data including a bit pattern to determine one or more locations of bad areas on the storage medium; and read the first certification data during a second rotation of the storage medium.

In certain embodiments, a system may comprise a data storage device configured to record data to a storage medium with a first recording width from a plurality of selectable recording widths, and record first certification data to the storage medium at the first recording width, certification data including a bit pattern to determine one or more locations of bad areas on the storage medium.

DETAILED DESCRIPTION

Figure 1:
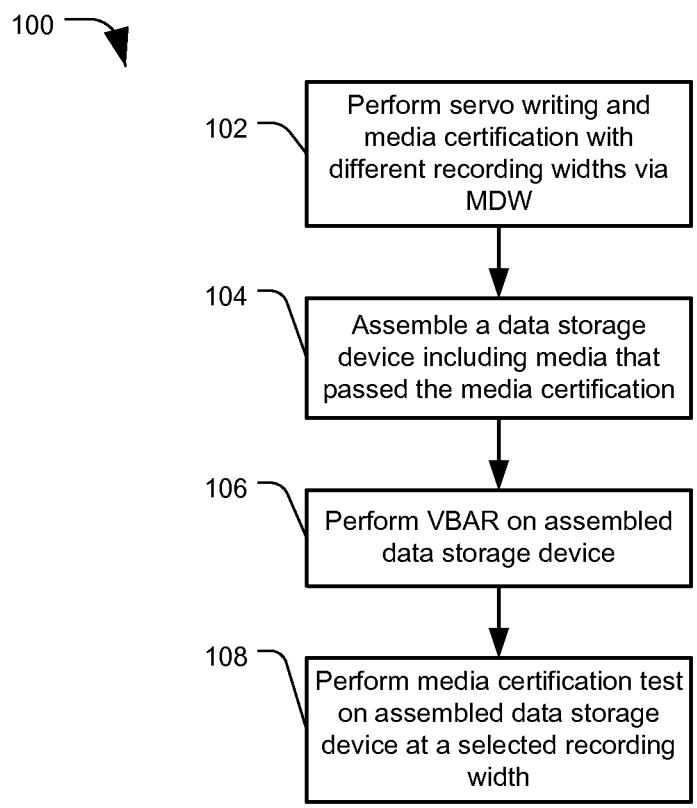
FIG. 1 is a flowchart of a method of media certification with different recording widths, in accordance with certain embodiments of the present disclosure.

In the following detailed description of certain embodiments, reference is made to the accompanying drawings which form a part hereof, and in which are shown by way of illustration of example embodiments. Features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that when executed cause a processor to perform the methods.

Data storage devices may store data to media such as rotating discs. During production of storage media, certification and servo writing processes may be performed on the media. Certification, servo writing, or both may be performed prior insertion of the media into a storage drive, or after insertion into the drive (e.g., the processes may be performed "in situ" by the drive itself). In some embodiments, servo writing may be performed prior to installation of the media in a drive, and certification may be performed after insertion. Certification may also be performed both prior to and after installation, in some embodiments. Servo writing and certification are described below.

Certification may include scanning a storage medium for defects. Media, such as magnetic discs used by hard disc drives (HDDs), may have defects that can affect the media's capability to have data written to or read from the media. To detect defects, media certification may be performed during drive production testing. Media certification may include writing data to the media, then reading the data back to determine if the read data corresponds to the written pattern.

Variations between the written pattern and the read pattern may indicate errors or imperfections on the disc surface. For example, certification tests performed prior to inserting a storage medium into a drive may be used to determine whether the media contains too many defects and should be discarded. In some embodiments, certification testing performed after installation into a drive may identify areas on a disc producing read back errors, and those areas may be marked as defective sectors and not used for user data storage by the completed storage device. Other embodiments are also possible.

In addition to media certification, drive production may also include performing servo writing operations on the storage media. Servo writing may include writing servo data or servo patterns onto the media. Servo data may include data used by a servo control system to control a position of a read or write head. Servo data may also define the position and width of user data tracks on which user data may be recorded by a disc drive. For example, the servo data may include track identification information which a drive may use to determine the location of the head relative to the media, burst patterns for centering the head over the current track, timing information for regulating read and write behavior, and other information. The completed drive may use the servo data to control head positioning and timing, for example when performing read, write, or seek routines. In some embodiments, the final position of data tracks may be adjusted after performing servo writing based on drive performance tests in order to meet drive target capacity, reliability requirements (e.g. encroachment and adjacent track interference (ATI) requirements), other requirements, or any combination thereof. Scale factors and other mathematical operations may be performed to correlate final data track positions to the recorded servo data and to account for eccentricities of the drive or storage medium.

Certification and servo writing processes can be very time consuming. For example, certification may include writing certification data across substantially the entire surface of a storage medium, and in some embodiments may require upwards of fifteen hours for a hard drive disc media. These long certification and servo writing processes can slow production efficiency. In addition, these processes may put extensive wear on the heads used for read and write operations. For example, heat assisted magnetic recording (HAMR) drives use a laser to heat the area of the disc being written. The laser changes the magnetic coercivity of the heated area, permitting the heated area to be affected by the magnetic write field while reducing the influence on the media outside the heated area. Controlling the write area based on a heated area may allow for higher areal recording densities on a disc. For example, using a low laser current may heat a small area and produce a narrow writing width. Conversely, using a high laser current may increase the area affected by the write, and thereby may increase the recording width. However, a HAMR write head (sometimes called a "near field transducer" or NFT) may have a limited lifespan, which may be influenced by an amount of writes performed and the strength of the laser current used to generate the laser.

Writing certification data to a storage medium at a wide recording width may reduce the time required to perform certification operations and may accelerate drive productions. Writing certification data at a narrow recording width may reduce wear on media writing equipment, which may include components of the final storage drive. A device having a modifiable recording width may allow manufacturers to accelerate drive production or reduce wear on HAMR recording equipment, in order to fit the manufacturer's needs. A method of performing servo writing and certification is described below in regard to FIG. 1.

FIG. 1 is a flowchart of a method 100 of media certification with different recording widths, in accordance with certain embodiments of the present disclosure. Method 100 may include performing servo writing and media certification with different recording widths. For example, servo writing may be performed by a disc writer device prior to installation of the disc into a drive. In some embodiments, the disc writer device 102 may include a multi-disc writer (MDW), which may be a specialized device configured to perform servo writing, certification, or both on one or more discs simultaneously. For example, a stack of multiple discs may be inserted into an MDW. The MDW may include a write element for each writable surface of each disc in the stack, and may record servo data, certification data, or both to each of the discs simultaneously.

In some embodiments, the disc writer device may be configured to record data at multiple recording widths. For example, the servo data may be written at a first recording width, and the certification data may be written at a second recording width. The certification performed at 102 may include writing certification data to substantially cover a writable surface of a storage medium, and reading back the certification data (e.g. a read-verify operation). If the read certification data does not match the written data, it may indicate bad areas on the disc. Media certification performed before installing a disc into a drive may be used to determine whether the disc contains too many bad areas to meet data storage requirements for a target drive and should be discarded. For example, if the number of detected errors exceeds a threshold, the disc may be discarded. Other embodiments are also possible.

The method 100 may include, at 104, assembling a data storage device including media that passed the media certification process. For example, one or more magnetic discs may be installed into a hard disc drive. Once a storage device is assembled with a storage medium, additional processes may be performed on the storage medium before the storage device is fully operational. In some embodiments, testing devices may be hooked up to an assembled storage device to control the storage device to perform the additional testing and processes. In some embodiments, the data storage device itself may be configured to perform the described processes. Other embodiments are also possible.

For example, method 100 may include performing variable bit aspect ratio (VBAR) testing on the assembled data storage device. VBAR testing may be used to determine recording densities to use during storage device operation when writing to and reading from the storage medium. The characteristics of the storage media and the recording heads may influence recording densities at which the storage device may operation. For example, the VBAR testing may be used to select bits per inch (BPI) linear recording densities to apply when writing to data tracks. In some embodiments, VBAR testing may also be used to determine a tracks per inch (TPI) density for the drive, indicating how closely the concentric data tracks may be spaced on the disc surface. The VBAR testing may be used to determine where the final data tracks will be located on the storage media, the sector spacing and location of data sectors along the tracks, and other configuration data. This data may be stored to the drive for use in servo control operations. Other storage density capability tests may also be used to determine storage density characteristics of a storage medium and to determine track and sector spacing.

After determining the locations of tracks and sectors on the storage media, the method 100 may include performing media certification testing on the assembled data storage device at a selected recording width, at 108. For example, the in-drive media certification may also include writing certification data to the surface of the disc (e.g. by writing the certification data so that it may be read from all data tracks). The certification day may then be read back (e.g., by performing a read-verify operation) to determine the location of errors that may indicate bad areas on the disc surface. The bad areas may be mapped to specific data sectors, which may be marked as bad sectors and stored to a memory of the data storage device (e.g. in a bad sector table). During operation, the data storage device may avoid using sectors identified in the bad sector table.

Method 100 is an example embodiment of servo writing and media certification, and changes may be made without departing from the scope of this disclosure. Some or all of the steps may be excluded or performed by other devices than those described. For example, in some embodiments a MDW may be used to record servo data but may not be used to perform media certification. In some embodiments, servo writing and certification testing may both be performed in drive, and a MDW may not be involved. Other embodiments are also possible. A disc writer device configured to perform media certification with different recording widths will be described in greater detail in regard to FIG. 2.

Figure 2:
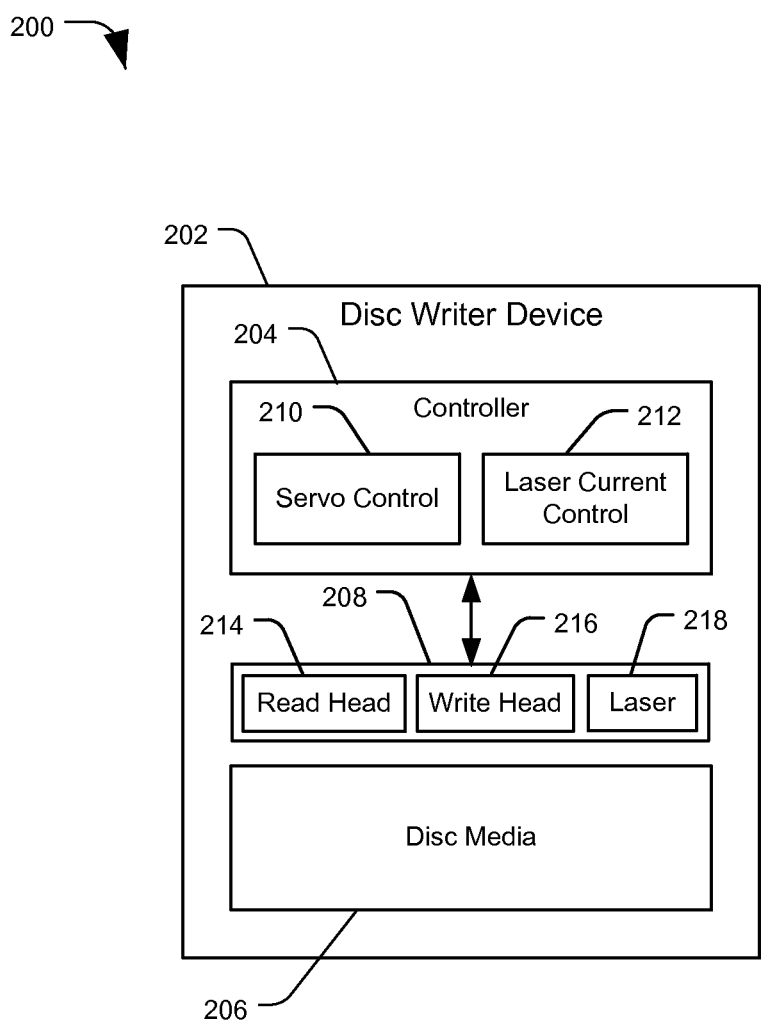
FIG. 2 is a diagram of a system configured to perform media certification with different recording widths, in accordance with certain embodiments of the present disclosure.

FIG. 2 is a diagram of a system 200 configured to perform media certification with different recording widths, in accordance with certain embodiments of the present disclosure. System 200 may include a disc writer device 202, which may include a controller 204, a head (sometimes called a transducer, a near-field transducer "NFT", or a read/write head) 208, and disc media 206. In some embodiments, the head 208 may include one or more transducers such as read head elements 214, write head elements 216, or both. The head 208 may also include one or more lasers emitters 218, sliders, air bearing surfaces, or other components. The head 208 may be mounted on a rotatable arm and configured to traverse a surface of the disc media 206 during read or write operations.

The disc writer device 202 may perform certification and servo writing operations on the disc media 206. The disc writer device 202 may use controller 204 to control the movement and operation of the head 208 relative to the disc media 206. The controller 204 may direct the head 208 to move to a desired position over a recording surface of the disc media 206 and to read data from or record data to the disc media 206. For example, the head 208 may include a read head 214 configured to detect a magnetic field from the disc media 206, and a write head 216 configured to generate a magnetic field to set a magnetic direction or polarity of a portion of the surface of the disc media 206, thereby recording bit values to the disc. A servo control element 210 may control the positioning and movement of the head 208. The controller 204 may control a size or "width" of the data tracks written to the disc media 206 by the write head 216. For example, the width of a data track may be influenced by a laser current used during writing operations, by performing write operations with one of multiple write heads 216 having different recording widths, through other means, or any combination thereof.

In some embodiments, the head 208 may include a laser emitter 218, such as in HAMR devices. The controller 204 may include a laser current control element 212, which may adjust an amount of current directed to the laser emitter 218, or otherwise control the intensity or strength of the laser emitted from the laser emitter. The parameters of the laser may determine the area of the disc media 206 influenced by a write head 216 of the head 208 (e.g. the recording width of the recorded data track).

The disc writer device 202 may include a data storage device, such as a hard disc drive configured to perform certification operations, servo writing operations, or both, on a disc 206 installed in the drive. In some embodiments, the disc writer device 202 may include a multi-disc writer (MDW). For example, a stack of multiple discs may be inserted into the MDW for certification or servo writing. The MDW may have a transducer element corresponding to each surface of each disc in the disc stack, and may record data to all the discs simultaneously. Optionally certification data may be read back to determine bad areas on the discs 206. The discs may then be removed from the MDW and installed into one or more disc drives. Other embodiments are also possible.

Controller 204, servo control 210, and laser current control 212 may include one or more circuits, processors, channels or other elements configured to perform the described functions. In some embodiments a memory device may store computer readable instructions that, when executed, cause the controller 204, servo control 210, or laser current control 212 to perform the described functions. The configuration of data on a disc medium, including servo patterns and data tracks, is described in regards to FIGS. 3A and 3B.

Figure 3A:
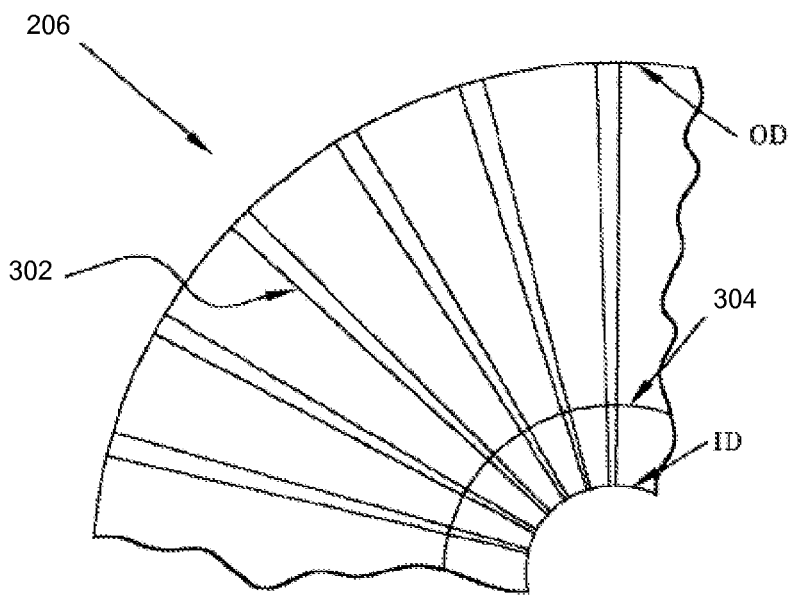
FIGS. 3A and 3B are diagrams of a system configured to perform media certification with different recording widths, in accordance with certain embodiments of the present disclosure.
Figure 3B:
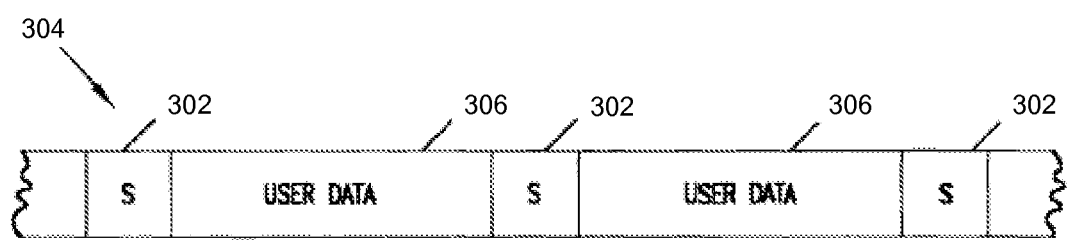

FIGS. 3A and 3B depict diagrams of a system configured to perform media certification with different recording widths, in accordance with certain embodiments of the present disclosure. FIG. 3A depicts a portion of disc media 206. Disc media 206 may include an inner diameter (ID) adjacent to a spindle about which the disc media 206 rotates during operation, and an outer diameter (OD) opposite the ID.

Disc 206 may include circular tracks 304 (only one shown) which extend circumferentially around each disc. As used herein, a "track" or "data track" may refer to a user data track on which a data storage drive can store user data during write operations. Radially-oriented (e.g. extending like spokes from the ID to the OD) servo patterns 302 contain servo information, which may be used for head positioning and track following during drive operation. For example, the servo data in the servo patterns may include information identifying a track, a servo sector, alignment patterns used to center a read/write head, other information, or any combination thereof. The servo data or servo information stored to the servo patterns 302 can be used by servo control systems to determine the boundaries and centerlines of each of the tracks 304. The servo data can be used to position the head over the tracks 304 of the disc 206, such as by seeking to a desired track or by following over the centerline of the desired track.

In some embodiments, the servo patterns 302 are not straight spokes. For example, the disc medium 206 may be subdivided into zones, with a zone comprising a plurality of concentric tracks 304. In some embodiments, different zones may have a different number of servo patterns 302, may have servo patterns 302 at different radial spacing on the disc medium 304, may have servo patterns 302 of different sizes, or other variations. The servo patterns 302 may be written to a disc 206 after the disc has been installed into a drive, or prior to installation into a drive.

Each track 304 may include a plurality of servo sectors or sector marks where the track 304 intersects with the servo patterns 302. Each of the servo sectors 302 can contain servo information or servo data that is stored in various servo fields. The servo information can be used to identify the location of data tracks 304. In some embodiments, the servo data may define the position of "servo tracks", for example by a track number or track ID. A circular servo track can include a circular string of sector marks, and may roughly correspond to data tracks 304. In some embodiments, however, the servo tracks and the data tracks 304 may have different axes of rotation resulting in eccentricity between the servo tracks and the data tracks. The data tracks may also have a different tracks per inch (TPI) density than the data tracks. Accordingly, additional computations may be performed, such as by a servo control system, to map data tracks 304 to the servo tracks in order to account for differences between the servo tracks and the data tracks.

Tracks 304 may be sequentially numbered in accordance with their radial position on the disc 206. For example, for a set of "N" tracks, track 1 may be located adjacent to an outer diameter (OD) of disc 206 and track N may be located adjacent to an inner diameter (ID) of disc 206.

An example of a portion of a track 304, shown in FIG. 3B, may include servo sectors 302 interspersed between user data areas 306, in which data such as user data, system data, and other data can be stored. Servo sectors 302 can provide coarse positioning information (such as a track ID information used to locate a desired track), as well as fine positioning information to indicate a position of a head relative to a center line of a given data track 304. For example, burst patterns or null-type servo patterns can be used for fine positioning.

As a disc 206 spins under a head, the drive may direct the head to read servo data at selected intervals (e.g. based on nanoseconds when a disc is spinning at a known rotation speed). The drive may use the read servo data (e.g. using a servo control system) to determine whether the head is centered over a desired track 304, and to perform any necessary positional adjustments. When the drive determines that the head is located over the desired track 304, the head may be used to read data from or record data to the user data portions 306.

Figure 4:
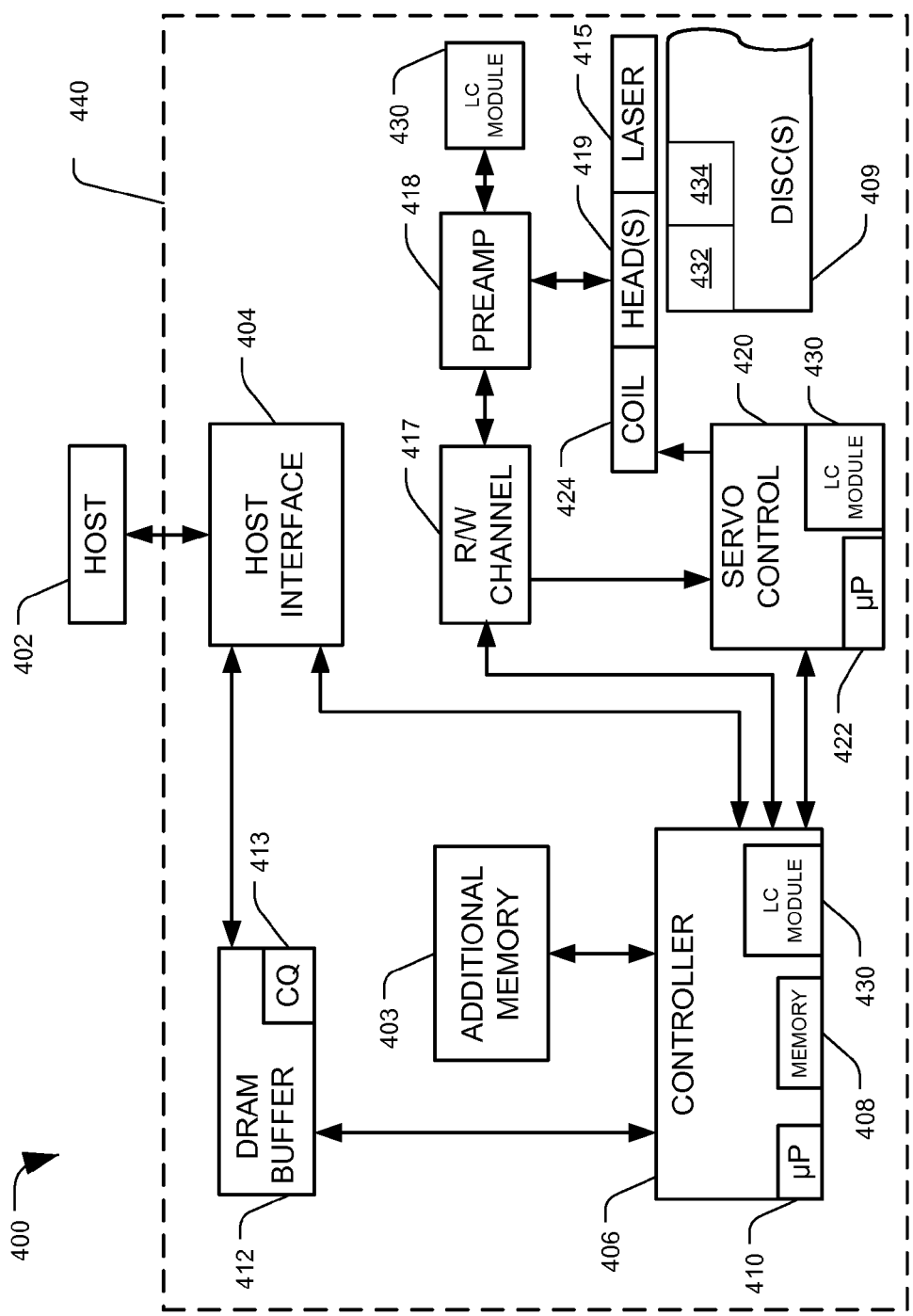
FIG. 4 is a diagram of a system configured to perform media certification with different recording widths, in accordance with certain embodiments of the present disclosure.

FIG. 4 is a diagram of a system 400 configured to perform media certification with different recording widths, in accordance with certain embodiments of the present disclosure. Specifically, FIG. 4 provides a functional block diagram of an example device 400. The device 400 may correspond to the disc writer device 202 of FIG. 2, and may include a data storage device (DSD), such as a hard disc drive (HDD), a hybrid solid state hard drive (SSHD), or other type of storage device. In some embodiments, device 400 may include a multi-disc writer (MDW), or any other device configured to perform media certification, servo writing, or both. Device 400 may be referred to herein as DSD 400.

The DSD 400 can include one or more storage mediums. The DSD 400 may have one or more disc(s) 409, either permanently installed or temporarily inserted into the DSD 400 for servo writing, certification, other disc fabrication or formatting functions, or any combination thereof. In some embodiments, the DSD 400 can include an additional memory 403 in addition to disc(s) 409. The additional memory 403 can be either volatile memory such as dynamic random-access memory (DRAM) or static random access memory (SRAM), or non-volatile memory, such as NAND Flash memory. The additional memory 403 can function as a cache and store recently or frequently read or written data, or data likely to be read soon. A DSD 400 containing multiple types of nonvolatile storage mediums, such as a disc(s) 409 and Flash 403, may be referred to as a hybrid storage device.

In some embodiments, the DSD 400 can communicate with a host device 402 via a hardware or firmware-based interface circuit 404. The interface 404 may comprise any interface that allows communication between a host 402 and a DSD 400, either wired or wireless, such as Universal Serial Bus (USB), IEEE 1394 (Institute of Electrical and Electronics Engineers standard 1394), Compact Flash, Serial AT Attachment (SATA), external SATA (eSATA), Parallel ATA (PATA), Small Computer System Interface (SCSI), Serial Attached SCSI (SAS), Peripheral Component Interconnect Express (PCIe), Fibre Channel, Ethernet, or Thunderbolt, among others. The interface 404 may include a connector (not shown) that allows the DSD 400 to be physically removed from the host 402. In some embodiments, the DSD 400 may have a casing or housing 440 containing the components of the DSD 400, or the components of the DSD 400 may be attached to the housing, or a combination thereof. In some embodiments the DSD 400 may be a standalone device that does not connect to a host 402, such as in the case of a programmable MDWs without separate host computer. Other embodiments are also possible.

The buffer 412 can temporarily store data during read and write operations, and in some embodiments can include a command queue (CQ) 413 where multiple pending operations can be temporarily stored pending execution. Commands arriving over the interface 404 may automatically be received in the CQ 413 or may be stored there by controller 406, interface 404, or by another component.

The DSD 400 can include a programmable controller 406, which can include associated memory 408 and processor 410. In some embodiments, the DSD 400 can include a read-write (R/W) channel 417, which can encode data during write operations and reconstruct user data retrieved from a memory, such as disc(s) 409, during read operations. A preamplifier circuit (preamp) 418 can apply write currents to the head(s) 419 and provide pre-amplification of readback signals. A servo control circuit 420 may use servo data to provide the appropriate current to the coil 424, sometimes called a voice coil motor (VCM), to position the head(s) 419 over a desired area of the disc(s) 409. The controller 406 can communicate with a processor 422 to move the head(s) 419 to the desired locations on the disc(s) 409 during execution of various pending commands in the command queue 413.

In some embodiments, the DSD 400 may include a laser emitter 415 and a laser control (LC) module 430. A "module" may be one or more physical components of a computing device (e.g., circuits) configured to perform a particular task or job, or it may be a program that, when executed, causes a processor to perform the particular task or job. The laser emitter 415 may be located on a rotating arm controlled by the coil 424 and proximate to or incorporated into the head(s) 419. The laser emitter 415 may generate a laser to heat a portion of the disc(s) during write operations, thereby changing the magnetic coercivity to facilitate the head(s) 419 in setting a magnetic field. The LC module 430 may control the power applied to the laser 415, which can modify the strength of the laser. A stronger laser can heat a larger area of the disc(s) 409, which in turn can increase an area of influence or "write width" of a recording head. For example, a lower power laser may produce a narrow write track, while a high power laser may produce a wide write track. The LC module 430 may adjust a current of the laser emitter 415 based on control signals from, e.g., the controller 406 or the servo control 420. In some embodiments, the LC module 430 may be located in or executed by the controller 406 or the servo control 420.

The DSD 400 may be configured to record data to the disc(s) 409 at different recording or track widths. The DSD 400 may be configured to switch between preset recording widths, may be configured to write at variable recording widths, or may otherwise adjust the width at which data is recorded. In some embodiments, first data 432 may be recorded at a first recording width, and second data 434 may be recorded at a second recording width. For example, a multi-disc writer DSD 400 may record servo data to the disc(s) 409 at a narrow recording width (e.g., half the width of a servo track of the disc(s) 409). The MDW DSD 400 may record certification data to the disc(s) 409 at a recording width wider than the servo data recording width (e.g. at a width equal to the servo track width, or a selected multiple of the servo track width). In some embodiments, a first set of data tracks may be recorded at a first recording width, and a second set of data tracks may be recorded at a second recording width. In some embodiments, more than two recording widths may be employed when writing data to the disc(s) 409. Other embodiments are also possible. Recording to a disc at different recording widths is discussed in greater detail in regards to the following figures.

Figure 5:
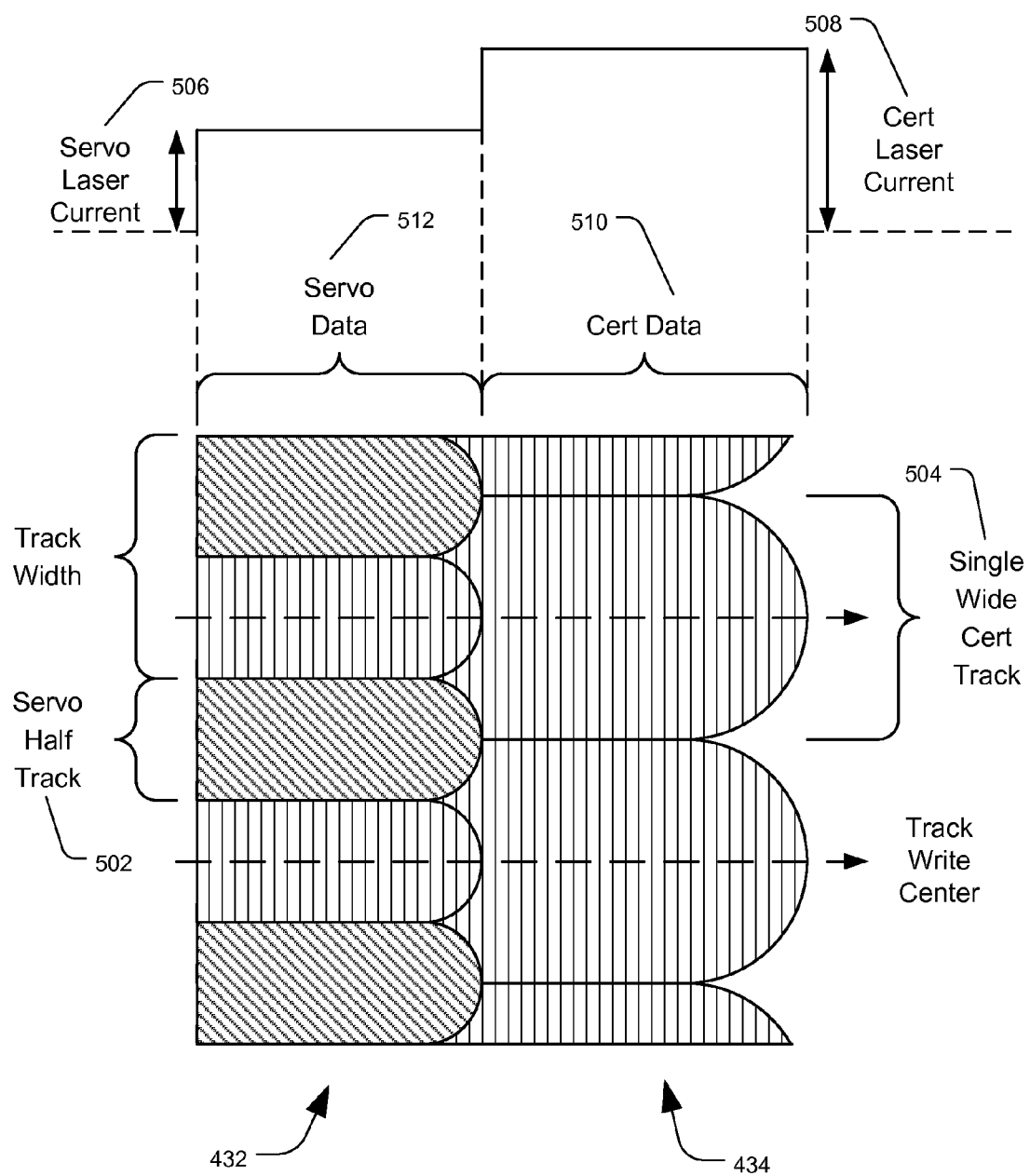
FIG. 5 is a diagram of a system configured to perform media certification with different recording widths, in accordance with certain embodiments of the present disclosure.

FIG. 5 is a diagram 500 of a system configured to perform media certification with different recording widths, in accordance with certain embodiments of the present disclosure. In particular, diagram 500 depicts a segment of a disc medium recorded with servo data 512 and certification ("cert") data 510. The servo data 512 may correspond to a first set of data 432 from FIG. 4 recorded at a first recording width 502. The cert data 510 may correspond to the second set of data 434 from FIG. 4 recorded at a second recording width 504. In some embodiments, FIG. 5 may depict a portion of a disc memory as it is recorded with servo data 512 and cert data 510 by a MDW, or in-situ by a hard disc drive. In some embodiments, the servo data 512 may be pre-written (e.g. by a MDW), and the cert data 510 may be written at a later point in production (e.g. after installation into a drive). Other embodiments are also possible.

In the depicted example, servo data 512 may be written at approximately half the width of a servo track, while the cert data 510 may be recorded at a full servo track width. As described previously, a servo track width may not correspond directly to the width of a data track 304 from FIGS. 3A and 3B used to record user data after the disc is formatted. The terms "half-track" and "full track" may therefore be exemplary or approximations. For example, the servo data and cert data may be recorded before the finalized data track widths have been determined, and may not directly correspond to the data track width. In some embodiments, cert data (such as cert data written in-drive after servo data writing and VBAR testing) may be written at a data track width, or some multiple of the data track width. Other embodiments are also possible.

In some embodiments, it may be advantageous to record servo data 512 at a narrow recording width. By recording servo data 512 at a narrow width, detailed and precise information can be recorded which facilitates proper servo positioning operations. For example, servo data 512 can include information such as burst patterns used to position a head over a track center. However, only one half track of servo data 512 may be recorded during each rotation of the disc media. Accordingly, fully recording servo data 512 at half-track widths to a disc may require at least two disc revolutions for each servo track.

As described above, cert data 510 may be a selected pattern (e.g. a specific sequence of bits) recorded to the media and read back to determine the existence and locations of media zones that are unreliable for recording. It may be advantageous to record most or all of the media surface with the cert data 510 in order to locate all potential bad sectors or areas. Accordingly, certification may include fully recording the media surface with cert data 510, as well as reading all of the cert data back. Some devices are capable of reading and writing data simultaneously. However, some storage devices are not capable of reading and writing magnetic data simultaneously. For example, the magnetic field generated by the write head during recording operations may interfere with the read head's ability to read the magnetic field of the disc surface. Therefore writing the entire disc surface with cert data 510 as well as reading the entire disc surface may require a full traversal of the disc at least twice (e.g. once to write the cert data 510, and a second time to read the cert data 510). In addition, if the servo data 512 is not recorded simultaneously with the cert data 510, multiple additional passes for each track may be required in order to record the servo data 512 as described above. In some embodiments the servo writing and cert data writing may be combined into a unified operation; however, if the cert data 510 is recorded at the same narrow width as the servo data 512, it may still require multiple disc revolutions per data track of the disc. The complete servo writing and certification process may therefore be extremely time-consuming.

For devices capable of recording at different recording widths, the number of disc rotations required to record data may be reduced, and in some embodiments, the total time to perform servo writing and certification testing may be significantly reduced. For example, it may not be necessary to record the cert data 510 at the same recording widths as the servo data 512. For example, a HAMR recording system may increase a write width by increasing a laser current. Some devices may include multiple write heads, with different heads capable of recording at different recording widths. In some embodiments, data can be written in a shingled recording scheme, where data on a current track is partially overwritten by data written to a subsequent track. The partially overwritten data may still be read, and may be considered as having been written with a narrow recording width. Other data may be written without being overlapped by later-written data, producing a wide recording width. The write power to a non-HAMR magnetic recording head, such as used for perpendicular magnetic recording (PMR), may be amplified to increase a write width. In some embodiments MAMR (microwave assisted magnetic recording) or WAMR (wire assisted magnetic recording) may also be used to produce different recording widths. Other recording width adjustment systems and methods are possible, or any combination thereof.

In the example of FIG. 5, a laser current may be adjusted to modify the recording width. A first laser current value 506 may be used when recording servo data 512, to produce a servo half-track recording width 502. A second laser current value 508 may be used when recording cert data 510, to produce a wider cert track recording width 504. As can be seen in the figure, the cert laser current 508 is greater than the servo laser current 506, producing a stronger laser and increasing the influence of the write element. Other embodiments are also possible.

In some embodiments including recording both servo data 512 and cert data 510, devices capable of adjusting a recording width may record a servo half-track at a narrow recording width, and then increase the recording width during the same disc rotation to record the cert data 510 at a wider recording width. Each track may include multiple sets of servo patterns as shown in FIG. 3B, and therefore the recording operation may alternate between writing servo data 512 and writing cert data 510 on a single disc revolution (e.g. record servo data, record cert data, record servo data, record cert data, etc.). In this manner, the cert data 510 may only need to be recorded to the disc on every other disc rotation. For example, on even numbered rotations, the device may record servo data 512 and cert data 510. On odd numbered rotations, the device may only record servo data 512. Because the device is not recording cert data 510 on odd numbered rotations, the device may use the read head in-between servo sectors to read the previously recorded cert data 510. For example, on odd numbered rotations, the device may operate in a pattern of: record servo data 512, read cert data 510, record servo data, read cert data, etc. In this manner, both the media certification and the servo pattern recording can be performed in a number of disc rotations approximately equal to the number of rotations required to record the servo data 512, while still certifying most or all of the surface of the media. The reading and writing process will be addressed in greater detail in regard to the following figures.

Figure 6:
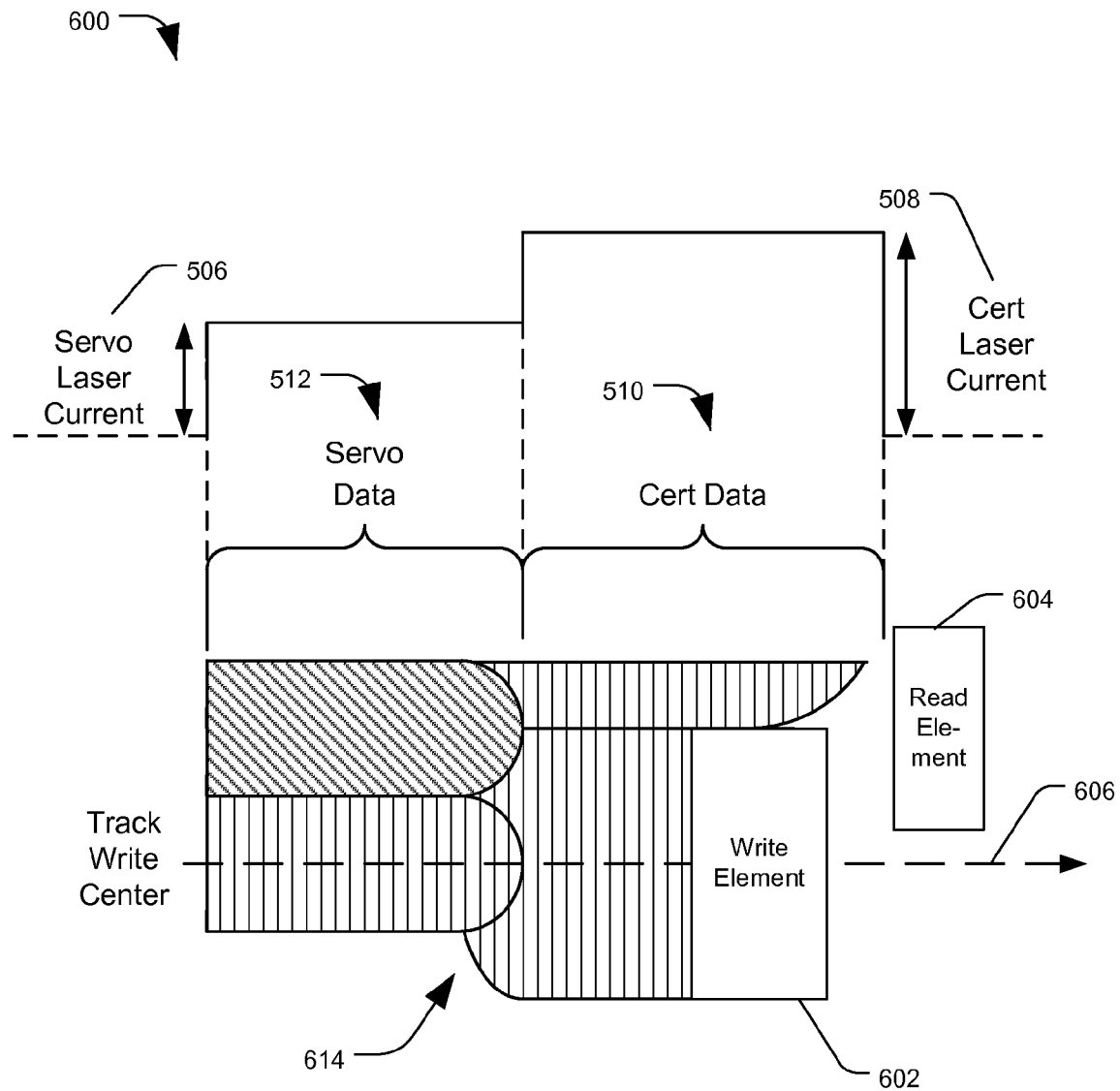
FIG. 6 is a diagram of a system configured to perform media certification with different recording widths, in accordance with certain embodiments of the present disclosure.

FIG. 6 is a diagram 600 of a system configured to perform media certification with different recording widths, in accordance with certain embodiments of the present disclosure. Diagram 600 again shows a portion of a disc media during an example servo writing and certification process. As described above, a disc writer device may be configured to write an alternating sequence of servo data and cert data on a given rotation of the disc medium. In some embodiments, the disc writer may include a write element 602, and a read element 604 offset from the write element 602. Both the write element 602 and the read element 604 may be components of a single read/write head, or they may be separate components. In some embodiments, the device may include more than one write element 602, read element 604, or both, for each surface of a disc media. In some embodiments, the write element 602 may also include a laser emitter or other elements that may facilitate or operate during a write operation.

In the example embodiment, the read element 604 may be offset from the write element 602 in a direction of previously recorded tracks. For example, if tracks are written sequentially from the outer diameter (OD) of a disc towards the inner diameter (ID) of the disc, the read element 604 may be offset from the write element 602 in the direction of the OD. When the read element 604 is positioned over previously-written data, the disc writer may use the read element 604 to read and verify previously-written data, as discussed herein. In some embodiments, the reader-writer offset may be based on head skew, which may result in the write element 602 and read element 604 being located over different radial positions of the disc as the angle of the arm and head change relative to the disc surface. Some devices may be configured so that the read element 604 is always offset to the same side (OD or ID) from the write element 602, or in some embodiments the offset side may change based on the location of the head over the disc (e.g. the reader may be offset towards the OD when the head is positioned from the ID to the disc center, and offset towards the ID when the head is positioned from the disc center to the OD). Accordingly, in devices where the read-write element offset changes based on position, servo data 512 or cert data 510 may be written in different directions for different sections of the disc, in order for the read element 604 to be positioned over previously written cert data 510. For example, tracks from the ID to the disc center may be recorded from the center towards the ID, and tracks from the OD to the disc center may be recorded from the center towards the OD. Other embodiments are also possible.

As the disc spins, the disc writer device may position the write element 602 over a track write center 606, and the write element may traverse the disc surface in the arrow-indicated direction. In some embodiments, the track write center 606 may be based on the center of a servo half-track. When the write element 602 passes over a portion of the track where servo data 512 is to be recorded, the disc writer device may control the write element 602 to record the servo data 512 at a first width, for example by using a first laser current level 506. In some embodiments, the recording width may be based on using a selected write element 602 from a plurality of different write elements, by otherwise adjusting the recording width, or any combination thereof. When the write element 602 passes over a portion of the track where certification data 510 is to be recorded, the disc writer may control the write element 602 to change the recording width and begin writing certification data 510, at position 614. For example, the writer device may increase a laser current level 508 for writing the cert data 510, resulting in a wider recording width. As the disc continues to rotate, the disc writer may change back and forth between recording servo data 512 at a first recording width and cert data 510 at a second, wider recording width along the track write center 606.

When a full disc rotation has completed and the disc writer has completed writing the servo data 512 and cert data 510 for that rotation, the disc writer may adjust the position of the write element 602. For example, the disc writer may adjust the write element 602 by an approximately half-track distance to begin recording the next set of servo sectors. In some embodiments, servo data 512 and cert data 510 may be recorded in a continuous spiral pattern, rather than in discrete individual concentric circular tracks. For example, recording in a spiral pattern may eliminate the seek time required to move a recording head from a current track to the next track, and may allow uninterrupted recording. Explanation of the example servo writing and certification operation of FIG. 6 is continued in regard to FIG. 7.

Figure 7:
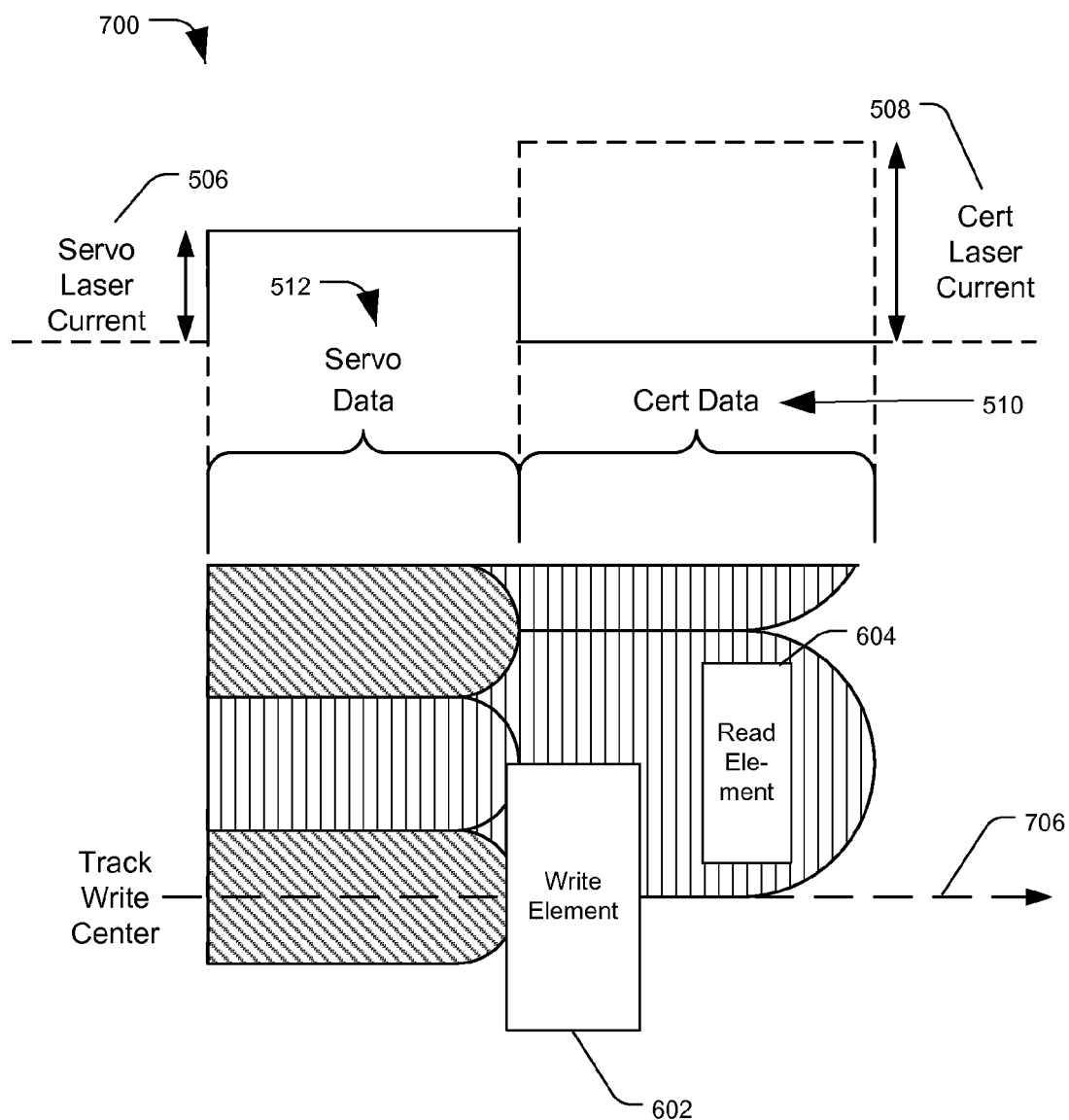
FIG. 7 is a diagram of a system configured to perform media certification with different recording widths, in accordance with certain embodiments of the present disclosure.

FIG. 7 is a diagram 700 of a system configured to perform media certification with different recording widths, in accordance with certain embodiments of the present disclosure. After recording servo data 512 and cert data 510 to the previous track as described in FIG. 6, the disc writer may adjust a position of the write element 602 to be centered over the next half-track 706 for writing the next set of servo data sectors. As discussed above, adjusting a position of the write element 602 to be centered over the next half-track may include seeking to a next half-track, or writing in a spiral pattern wherein the head has reached the same circumferential position as previously-written data at approximately a half-track radial offset in the recording direction. Adjusting a position of the write element 602 may include adjusting a position of the read element 604 as well, if the two are connected, or the disc writer may adjust a position of the read element 604 independently to be positioned over the previously recorded cert data 510. Although the read element 604 is depicted as positioned over the most recently written cert data, in some embodiments the read element 604 may be positioned over data recorded several disc rotations previously (e.g. several tracks previous).

As with the previous half-track, when the write element 602 passes over a portion of the track where servo data 512 is to be recorded, the disc writer may control the write element 602 to record the servo data 512 at the first recording width, for example by using a first laser current level 506.

When the write element 602 exits the portion of the track where servo data 512 is to be recorded and enters the cert data portion 510, the disc writer may cease writing operations. The cert laser current level 508 may be reduced to zero or some baseline current not used for data recording. Because the cert data 510 is written with a wider recording width than the servo data 512, cert data does not need to be written during every disc rotation. Instead, the disc writer device may begin reading data when the read element 604 enters the cert data section 510 of a previously recorded track. The read element 604 can read the previously recorded cert data 510, and the disc writer can analyze the read data to determine whether it matches the expected cert data bit pattern that was written onto the disc. If there is an error in the read data, the disc writer may store an indication of the error, such as by keeping a total of detected errors, making a log of the position at which the error was read, storing other indicators, or any combination thereof. In some embodiments, discs exhibiting more than a threshold number of errors may be discarded rather than used in a final product. In some embodiments, the disc locations exhibiting read errors may be marked as bad sectors and not used for storing user data. Other embodiments are also possible.

In some embodiments, the read element 604 may not need to be specially centered over a previously-recorded track in order to read the cert data 510. Because the cert data 510 may be written coherently across one or more tracks, the read element 604 may be able to accurately read the cert data 510 without adjusting a head position to center the read element 604. In some embodiments, the reader-writer offset may be essentially zero at some positions of the disc (e.g. the read element 604 and the write element 602 may be substantially aligned over the same radial position), and in those positions the read element 604 may not be positioned to read previously-written cert data 510. A certification process may be configured to read previously-recorded cert data 510 with an offset read element 604 for portions of the disc, and not employ the offset reading technique when the read element 604 and write element 602 are substantially aligned. Other embodiments are also possible.

In some embodiments, a small portion of cert data 510 near the servo data 512 area may not be read by the read element 604. For example, a delay due to switching from write operations to read operations, or a small spatial gap from the writer-reader offset, may mean the read element 604 may not read all the cert data 510 immediately adjacent to a servo area may not be read and verified. However, this area would be small and unlikely to affect the performance of a drive or storage medium. In other embodiments, a disc writer device may be configured to check all of the cert data 510, for example due to specific head design, reduction or elimination of operation-switching delays, or other design implementations. Other embodiments are also possible.

When the write element 602 again enters a portion of the track where servo data 512 is to be recorded, the disc writer may cease reading operations and write the next servo sector. Accordingly, during this disc rotation, the disc writer may alternate between writing servo data 512, reading previously written cert data 510, writing servo data 512, etc. While in the example embodiments of FIGS. 6 and 7 the cert data is recorded at approximately twice the width of the servo data, other embodiments are also possible. For example, instead of writing the servo data 512 at servo half-track recording width and the cert data 510 at full servo track recording width, the cert data may be recorded at recording width that is twice as wide as a data track, three times as wide, other widths, or any combination thereof. An example of using a wider cert data recording width is described in relation to FIG. 8.

Figure 8:
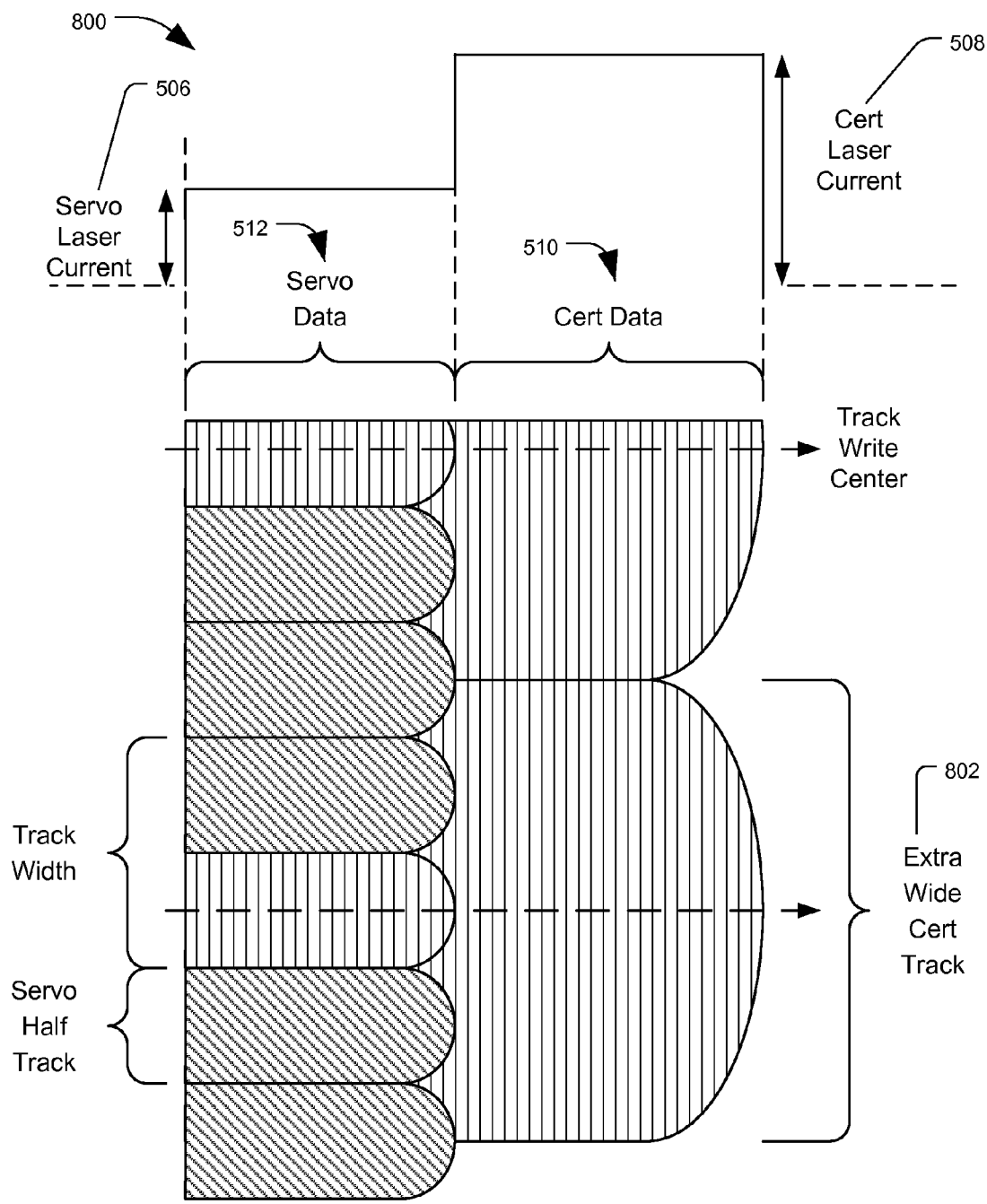
FIG. 8 is a diagram of a system configured to perform media certification with different recording widths, in accordance with certain embodiments of the present disclosure.

FIG. 8 is a diagram 800 of a system configured to perform media certification with different recording widths, in accordance with certain embodiments of the present disclosure. In the depicted embodiment, servo data 512 may still be recorded using a servo half-track recording width, for example by using a first laser current setting 506. Rather than recording the cert data 510 at a full servo track width, however, the cert data may be recorded using an extra wide recording width 802. The cert recording width 802 may be approximately twice the width of a full servo data track, by applying a second laser current setting 508 substantially higher than the servo laser current 506. In some embodiments, the servo data may be pre-written, and the cert data may be written at some multiple of a data track width within a drive (e.g. 1×, 2×, etc. of the final data track width). Only writing cert data 510 once per several disc rotations allows more opportunity to perform read operations.

While many of the examples provided herein are directed to systems and methods for performing combined servo writing and cert data writing operations, media certification with variable recording widths is not limited thereto. For example, a disc writer device configured to record data at different recording widths may be used to record cert data after servo data is already written. A recording width at which to record the cert data may be selected based on various factors, such as certification testing time and equipment wear.

For example, a HAMR disc drive may be used to perform certification testing on a disc installed in the drive. A high laser current applied to the cert write operations may allow multiple data tracks to be recorded per disc rotation, reducing the overall certification test time. However, in some embodiments using high laser current levels may put wear on the near-field transducer (NFT), potentially shortening the working lifespan of the drive. Using a low laser current setting may narrow the recording width and require additional time to complete certification testing, but may greatly reduce the wear on the NFT and improve the lifespan of the drive. Manufacturers may tailor the write width settings based on the performance specifications of the equipment and the needs of the manufacturers. For example, a NFT for a given drive may be capable of recording at a recording width of approximately a full data track width without significant wear, at twice a data track width with low wear, and at three times a track width with moderate wear. A manufacturer may choose to record cert data at approximately twice a track width to accelerate manufacturing without placing extensive wear on the NFT. In some embodiments, a HAMR drive may be intended for long-term storage without frequent write operations. In such an embodiment, the manufacturer may be willing to put additional wear on the NFT to accelerate manufacturing because the NFT may not see significant use after production. The manufacturer may therefore record cert data at triple the data track width to further shorten production times. Other embodiments are also possible. The certification time reduction in relation to recording width will be discussed in regards to FIG. 9

Figure 9:
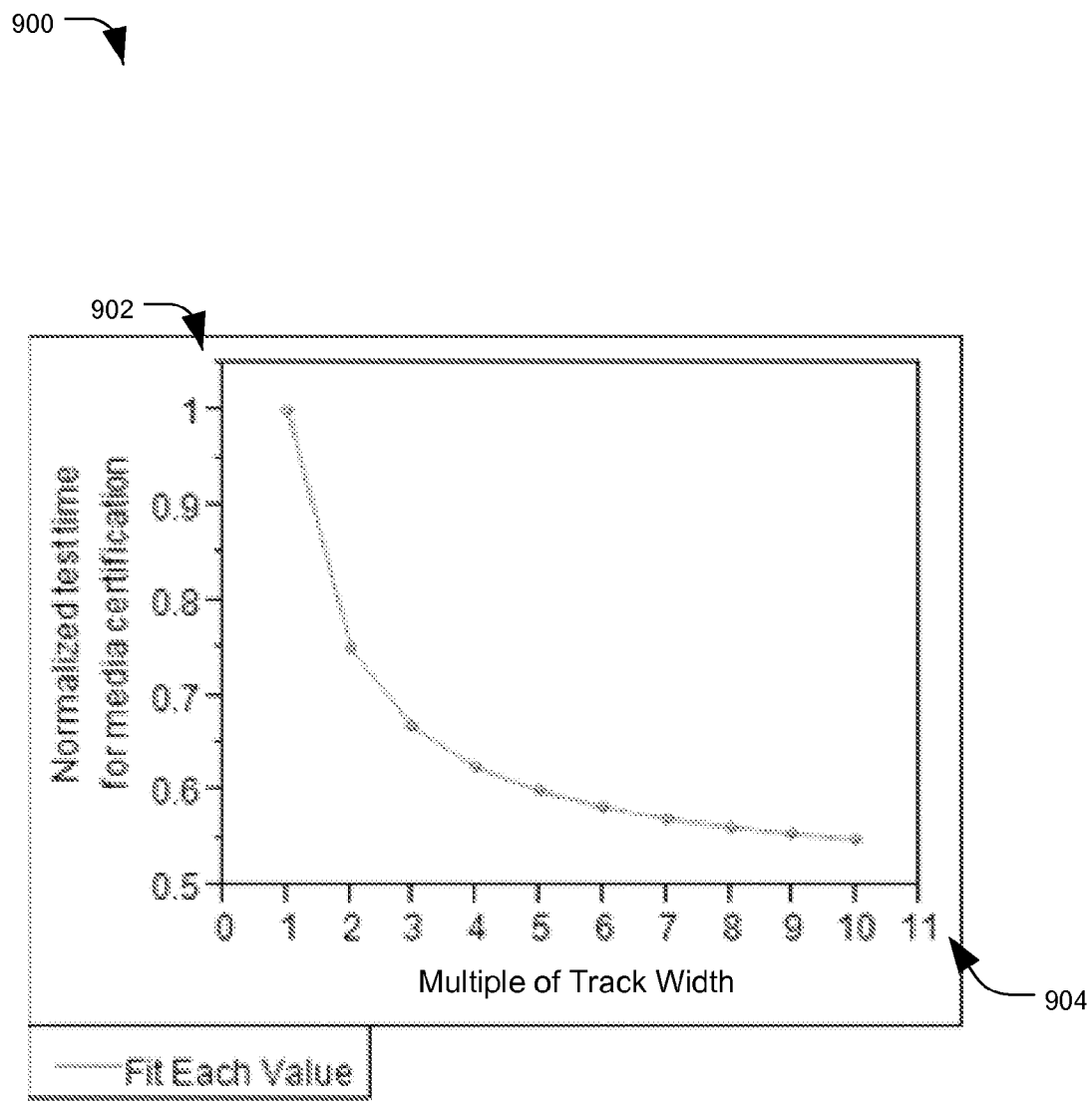
FIG. 9 is a chart reflecting results of media certification with different recording widths, in accordance with certain embodiments of the present disclosure.

FIG. 9 is a chart 900 reflecting example results of media certification with different recording widths, in accordance with certain embodiments of the present disclosure. Chart 900 reflects the influence of cert track widths on a normalized test time for completing media certification testing, according to some embodiments. In particular, Y-axis 902 relates to a normalized test time for media certification, while X-axis 904 relates to the multiple of a "standard" data track width at which the cert data is recorded. The normalized test time may be considered a multiplier of the time it takes to perform media certification, other factors being equal. For example, the normalized test time may be the value "1" when cert data is recorded at a full track width (recorded at a track width of "1"). When the cert data is recorded at two times a track width, the media certification test time may be approximately 0.74 times the normalized test time. When cert data is recorded at three times a track width, the media certification may be completed in approximately 0.67 times the normalized test time. The rate of increased test completion may drop off as the track width multiplier increases. Other embodiments are also possible.

It may be important not to overwrite the servo data when writing cert data, as the servo data may be used for the duration of a drive's operating life. Increasing the write width of the cert data may include enlarging the "spot size", or area of influence, of the write head. In some embodiments, the increased spot size may be considered when determining when to start and stop cert writing operations in order to avoid damaging the servo data. The spot size evaluation is addressed below in regard to FIG. 10.

Figure 10:
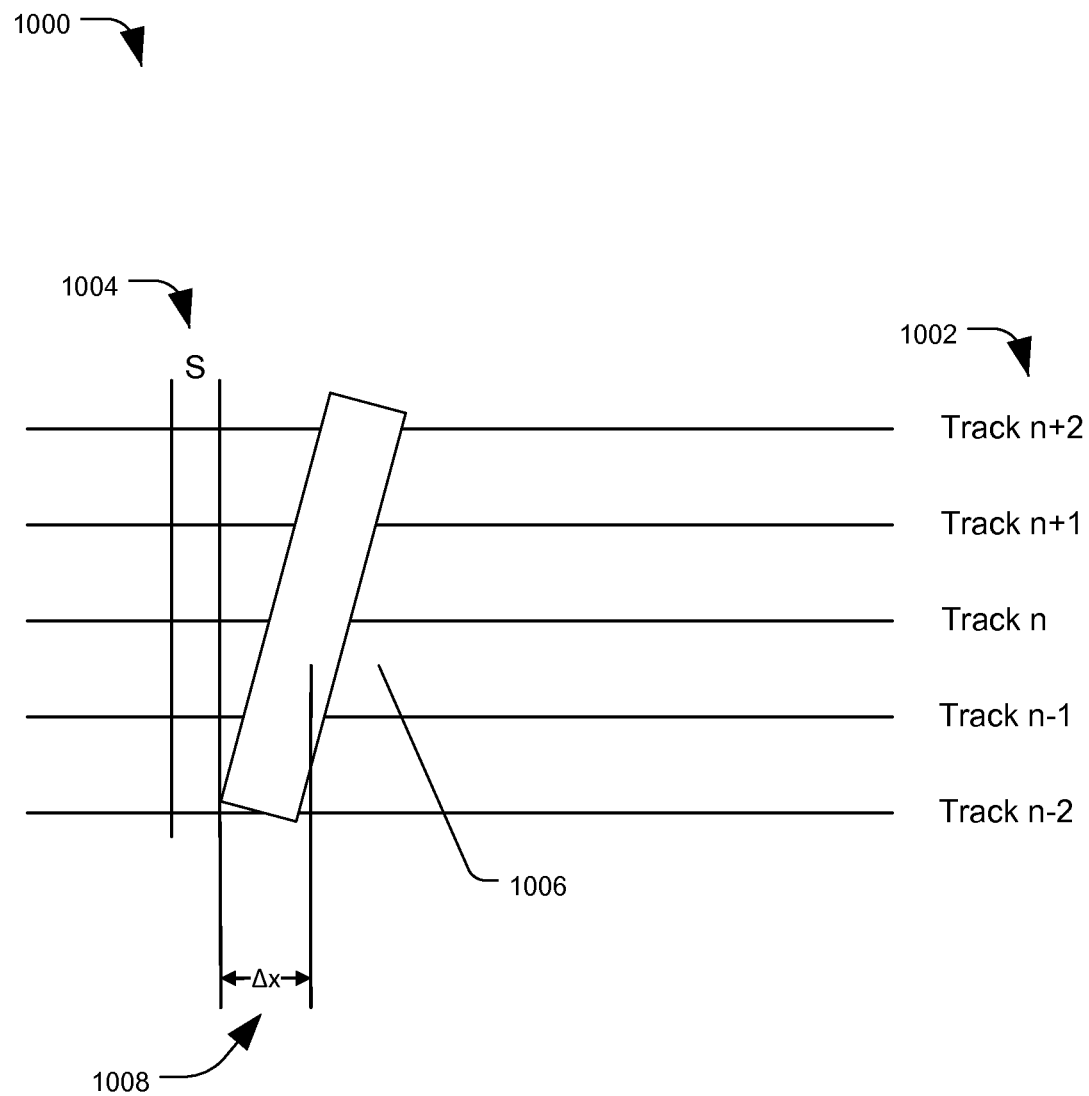
FIG. 10 is a diagram of a system configured to perform media certification with different recording widths, in accordance with certain embodiments of the present disclosure.

FIG. 10 is a diagram 1000 of a system configured to perform media certification with different recording widths, in accordance with certain embodiments of the present disclosure. Diagram 1000 may depict a portion of a disc storage medium. The disc storage medium may include a set of tracks 1002, including five tracks n–2 through n+2. A servo pattern 1004 may include servo data for each of the set of tracks 1002.

A transducer 1006 may include a write element used to write cert data to the set of tracks 1002, and in some embodiments may also record the servo data 1004. When recording data with a narrow recording width, such as when recording servo data at a fraction of a track width, the write element's 1006 area of influence or spot size may be small; for example, directly under the center of the write element 1006. When the increasing the recording width, for example to record cert data to multiple tracks simultaneously, the area of influence of the write element 1006 may expand, for example to the physical extents of the write element 1006, or even beyond.

In order to prevent damage to the servo data 1004 when the write width is increased, a delay 1008 at least equivalent to the spot size increase may be implemented during write operations. For example, when the write head exits the servo data area 1004, a disc writer may delay initiating cert data writing operations at an expanded recording width for a delay distance represented by Δx, or a delay period Δt. For example, a delay Δx 1008 equivalent to or greater than the distance between the center of the write element 1006 and the extent of the recording area of influence may be implemented after exiting a servo area 1004 and before beginning cert writing. The delay may be especially important if the write element 1006 is skewed as shown in FIG. 10. Other methods to compensate for the write spot zone overlapping the servo area 1004 may be implemented, such as zero skew writing.

Example calculations for Δx and Δt are provided. If the write element 1006 is writing at a 5× recording width (e.g. writing cert data to tracks n–2 to n+2), then N=5. A worst-case scenario may be recording near the ID (e.g. radius=0.6 in) with a large skew (e.g. 15 degrees), with the disc spinning at 5400 revolutions per minute (RPM). Δx may be calculated as:

Δx=1/TPI*N/2*sin θ=1.94 μin

Linear velocity=radius*RPM*2*pi/60=340 IPS
(inches per second)

Δt=Δx/linear velocity (IPS)=5.7 ns (nanoseconds)

Drives may already include a delay when switching between operation modes, such as when switching from servo data read operations to write operations. In some embodiments, this delay may be long enough that no additional delay is required to protect the servo data. In some embodiments, the delay may be set to at least Δt to prevent damage to servo data. The disc writer may be configured with a delay based on a worst-case value, or the disc writer may be configured to calculate the necessary delay value during write operations and generate an additional delay as necessary. Other embodiments are also possible.

In some embodiments, similar calculations may be implemented when recording cert data and approaching the next servo data area 1004. The disc writer may cease cert data writing operations before reaching the servo data area 1004 based on an area of influence of the write head. Example methods by which a disc writer may control reading and writing operations is described below in relation to FIGS. 11A and 11B.

Figure 11A:
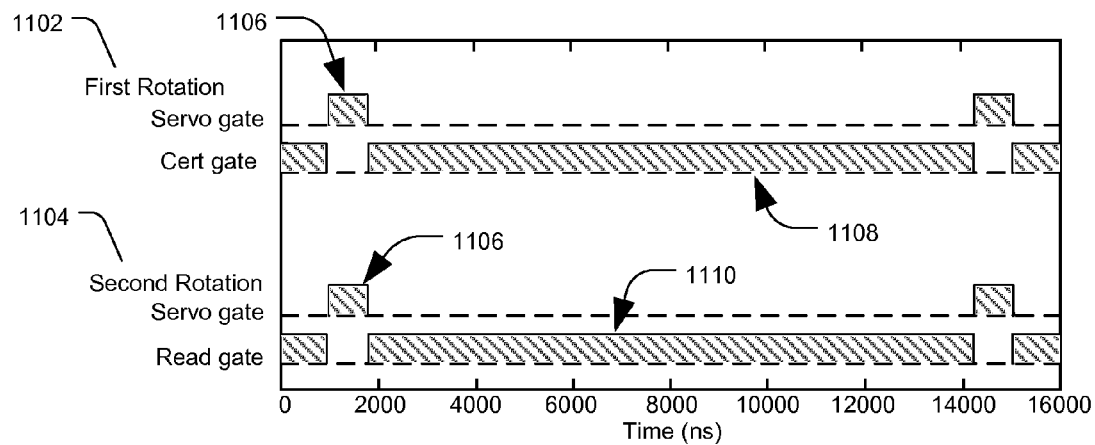
FIGS. 11A and 11B are diagrams of a system configured to perform media certification with different recording widths, in accordance with certain embodiments of the present disclosure.
Figure 11B:
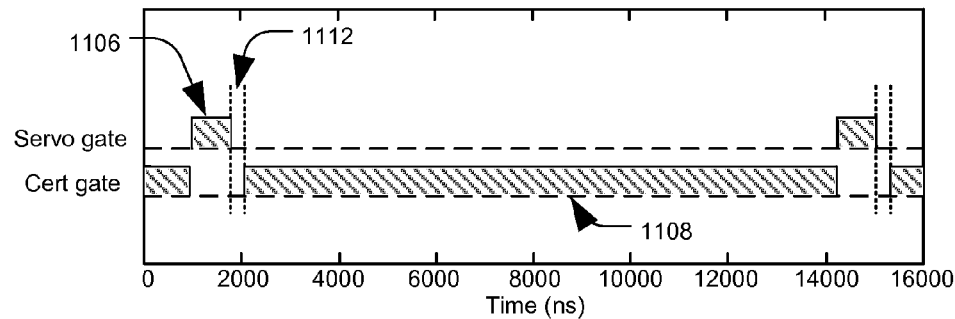

FIGS. 11A and 11B depict diagrams of a system configured to perform media certification with different recording widths, in accordance with certain embodiments of the present disclosure. FIG. 11A depicts a sequence of operations of a disc writing device as controlled by gate signals.

A disc controller can use gate signals to control the behavior of read or write heads. These gates signals can control the behavior of an R/W channel and preamp as the head moves across the disc. Gates may control which values and parameters the device uses to control the head and handle signals read from the disc. For example, a drive may use write gates to control a head to perform write operations to a disc, read gates to control a head to read user data from a disc, and servo gates to control a head to read servo data from servo sectors. Gates may also be used to prevent certain drive behavior. For example, an active write gate may prevent read operations, and an active read or servo gate may prevent write operations. In some embodiments a drive may be physical prevented from writing data until a write gate signal is activate, because the preamp may not allow the heads to write.

As an example, during normal drive operation a read gate signal may be used to have the head read user data. The controller may switch on a servo gate signal, or "sgate," to identify when to retrieve servo data from the disc. The controller may switch on the sgate when a servo signal is anticipated, which allows the system to read and interpret the servo patterns. An sgate signal may also prevent the servo data from being overwritten by preventing writing operations. The sgate may protect the servo patterns and define where the servo patterns may begin and end. In embodiments of disc writers performing servo writing operations, the servo gates or sgates may also be used to determine when to record servo data to the disc medium.

The disc writing device may determine when activate various gate signals based on time intervals, for example by monitoring a system clock. Within a zone of a disc, servo sectors may be located at regularly spaced intervals, and may therefore may occur at set time intervals when a disc is rotating at a consistent speed.

FIG. 11A depicts an example embodiment of a portion of two disc rotations during a media certification operation. In some embodiments, FIG. 11A may depict a combined servo writing and media certification operation. During the first rotation 1102, two types of gates may be activated: servo gates 1106, and cert gates 1108. At selected time intervals of the first rotation 1102, the disc writer may activate a servo gate 1106. The servo gate 1106 may control a write head to record servo data to the disc surface at a first recording width. After a time interval set based on the servo sector size (in the depicted embodiment, approximately 1000 nanoseconds (ns) in duration), the disc writer may switch off the servo gate 1106 and activate the cert gate 1108. The cert gate 1108 may control the write head to record cert data to the disc surface at a second recording width. After a time interval corresponding to the user data area between servo sectors (in the depicted embodiment, approximately 12,000 ns), the disc writer may shut off the cert gate 1108 and reactivate the servo gate 1106. This pattern may repeat for the duration of the first rotation 1102 until the entire track has been written with servo data and cert data.

The position of the head may be adjusted to a next half-track (or other incremental distance) for the second rotation 1104. Once again, when the disc writer determines that the location for a servo sector is passing under the head, the disc writer may activate the servo gate 1106 and write servo data. When the head passes the servo sector, the disc writer may deactivate the servo gate 1106 and activate the read gate 1110. The read gate 1110 may control a read head to read data recorded to the disc surface. The read head may read previously written cert data, which can be analyzed by the disc writer to determine whether the disc surface may include defects influencing read or write operations. When the next servo sector area approaches, the disc writer may deactivate the read gate 1110 and reactivate the servo gate 1106. This pattern may continue for the duration of the second rotation 1104 until all servo data has been written to the current track and the previously written cert data has been read.

In another embodiment, FIG. 11A may depict an example of recording cert data to a disc pre-written with servo data. During the first rotation 1102, the servo gates 1106 may control a head to read servo data to determine head positioning and track following information. The servo gate 1106 may be deactivated and the cert gate 1108 may be activated to control writing the cert data. The second rotation 1104 may be performed after the first rotation 1102, although in some embodiments it may not immediately follow the first rotation 1104 (e.g. the disc writer may write cert data to multiple tracks before performing read-verify operations). Second rotation 1104 may include the head traversing the same track as the first rotation 1102. During the second rotation 1104, the servo gate 1106 may be activated to control reading of the servo data, and the read gate 1110 may be activated to control reading of the cert data recorded during the first rotation 1102. In some embodiments, the cert data may be recorded during the first rotation 1102 at a wide recording width to cover multiple data tracks. Further, the read head may only be configured to read from a single data track at a time. Accordingly, for each disc rotation in which cert data is written at a width wider than a data track, multiple rotations may be performed to read the cert data back from each written track. For example, if cert data is written at four times a track width, a disc writer may perform four read rotations for every one write rotation. Other embodiments are also possible.

FIG. 11B depicts an example embodiment of a portion of a single disc rotation during a media certification operation. In the depicted embodiment, an additional write delay may be implemented as described in regards to FIG. 10 when switching from servo reading or writing to cert writing, and vice-versa. When the disc writer determines that servo data is to be written or read, the disc writer may activate the servo gate 1106 and record servo data at a first recording width, or read servo data already recorded. When the servo sector is over, rather than immediately activating the cert gate 1108 and writing cert data at a wide recording width, the disc writer may implement a delay 1112. The disc writer may calculate the delay period based on the recording width used to write the cert data, a skew of the write head, based on other factors, or any combination thereof. In some embodiments, the delay period 1112 may be pre-programmed in to the disc writer. In some embodiments, the delay period 1112 may be added to the servo gate duration, and therefore the servo gate 1106 may remain active for the duration of the servo area plus the delay period 1112. In some embodiments, the servo gate 1106 may be deactivated as normal, but the disc writer may delay activating the cert gate 1108 for the delay period 1112. Other embodiments are also possible.

Figure 12A:
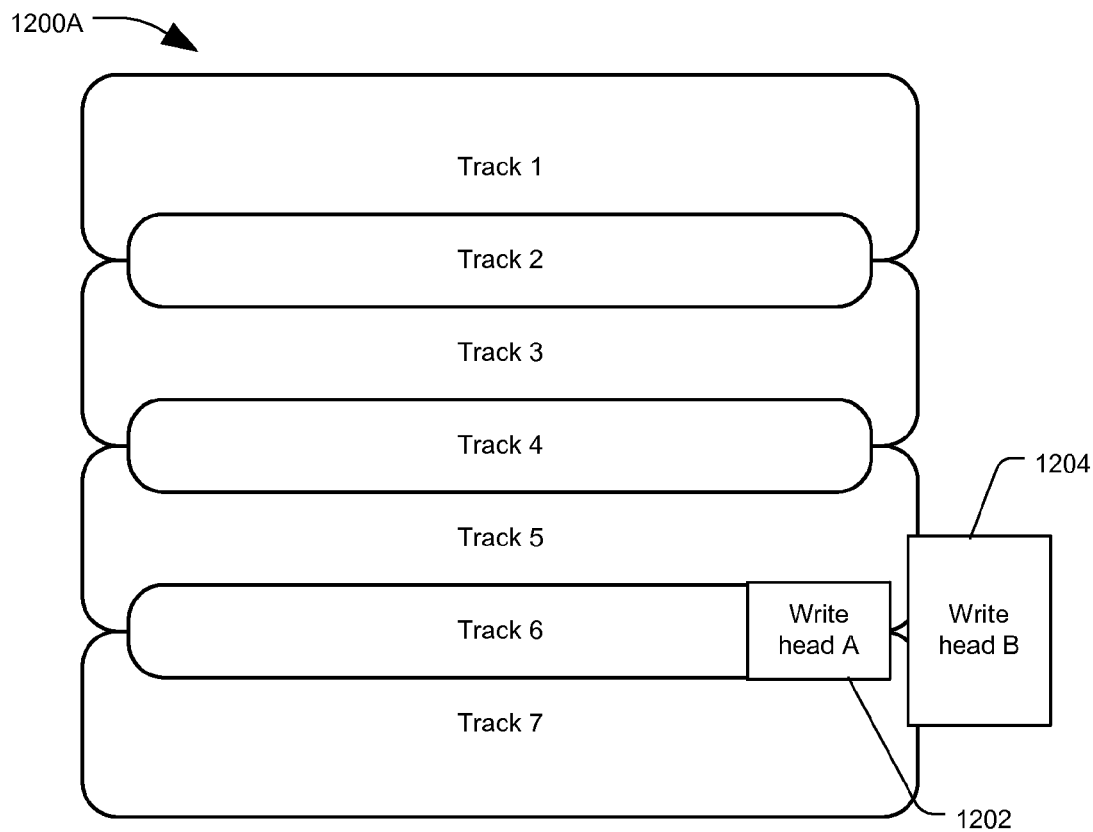
FIGS. 12A and 12B are a diagrams of a system configured to perform media certification with different recording widths, in accordance with certain embodiments of the present disclosure.

FIG. 12A is a diagram 1200A of a system configured to perform media certification with different recording widths, in accordance with certain embodiments of the present disclosure. In particular, diagram 1200A depicts an example of an interlaced magnetic recording (IMR) track writing scheme. IMR may include recording different tracks at different recording widths. For example, odd tracks may be recorded at a wide recording width, while even tracks may be recorded at a narrower recording width. IMR can be implemented similarly to shingled magnetic recording (SMR), wherein some tracks partially overlap adjacent tracks. In the depicted embodiment, the even-numbered tracks partially overlap the odd-numbered tracks. Despite the partial overlap, the read head should still be able to read the data from all the tracks. However, unlike SMR where updating the data on a track may require rewriting an entire band of tracks, updating tracks in IMR may only require rewriting three tracks or less. For example, updating track 3 may cause tracks 2 and 4 to become unreadable. Accordingly, when updating track 3, the data from tracks 2, 3, and 4 may be read, and the data in track 3 updated. The updated track 3 may then be written back to the disc, followed by tracks 2 and 4. By partially overlapping tracks, the areal recording density of a disc may be increased, while the IMR writing scheme can limit the amount of additional time required to perform write operations.

In some embodiments of IMR, the overlapping tracks (e.g. the even-numbered tracks) may be recorded at a different recording width than the overlapped tracks (e.g. the odd-numbered tracks). For example, the overlapped tracks may be recorded at a wider width, to ensure they can still be read when overlapped on both sides by adjacent tracks. In some embodiments, the wide tracks may be recorded at a higher linear density (bits per inch BPI when writing to a track) than the narrow tracks. Writing the narrower tracks at a lower BPI may improve the signal to noise ratio (SNR). Accordingly, in some embodiments writing data tracks at different recording widths may also include adjusting a linear recording density at which the tracks are written.

Drives employing IMR may be configured to record data using at least two different write widths. In some embodiments, this may be performed using HAMR lasers operating at different laser currents, as described herein. In some embodiments, the drive may be configured with two or more different write heads, each configured to record at different recording widths. In the depicted example of FIG. 12A, a disc writer device may include a write head A 1202, and a write head B 1204. Both write heads may be included in a single head assembly or mounted on the same arm over the disc, or the heads may be separately located or controlled. Write head A 1202 may be configured to record at a narrower recording width, for example to record the even-numbered tracks. Write head B 1204 may be configured to record at a comparatively wider recording width, for example to record to the odd-numbered tracks. Other embodiments are also possible.

Figure 12B:
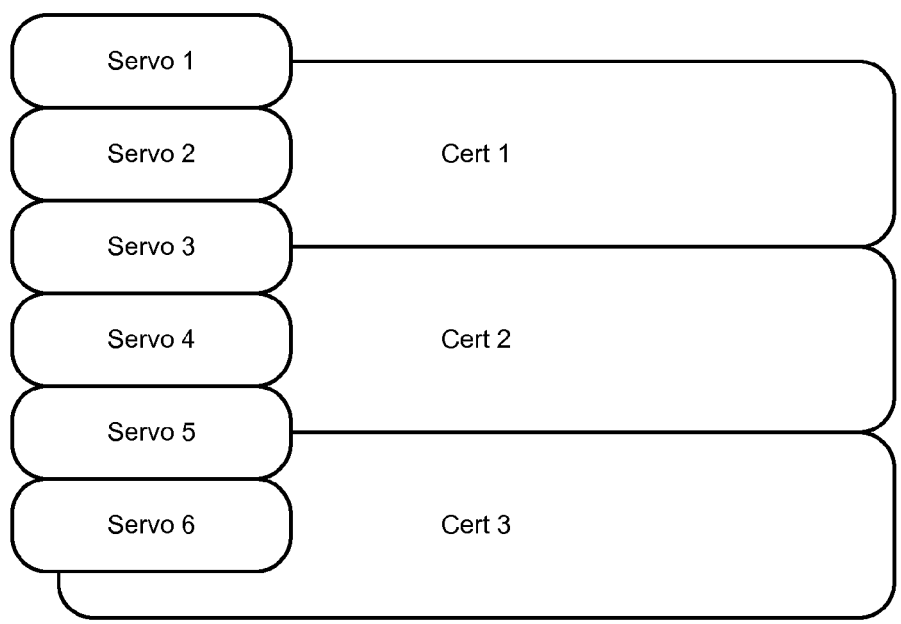

The different write heads or different laser current settings may be used to perform the servo writing and media certification processes as described herein. For example, as depicted in FIG. 12B, the servo data sectors may be recorded using write head A 1202, while the cert data may be recorded using write head B 1204.

As described previously, a device configured to write data at different recording widths may record certification data using a selected width. For example, an IMR device may be configured to record data using at least two recording widths. The wider recording width could be used to record cert data to an entire disc surface to accelerate the testing operation. In another embodiment, the cert data may be written with the narrower recording width, such as to reduce wear on a transducer. An example embodiment of recording cert data with an IMR device is described in regard to FIGS. 13A and 13B.

Figure 13A:
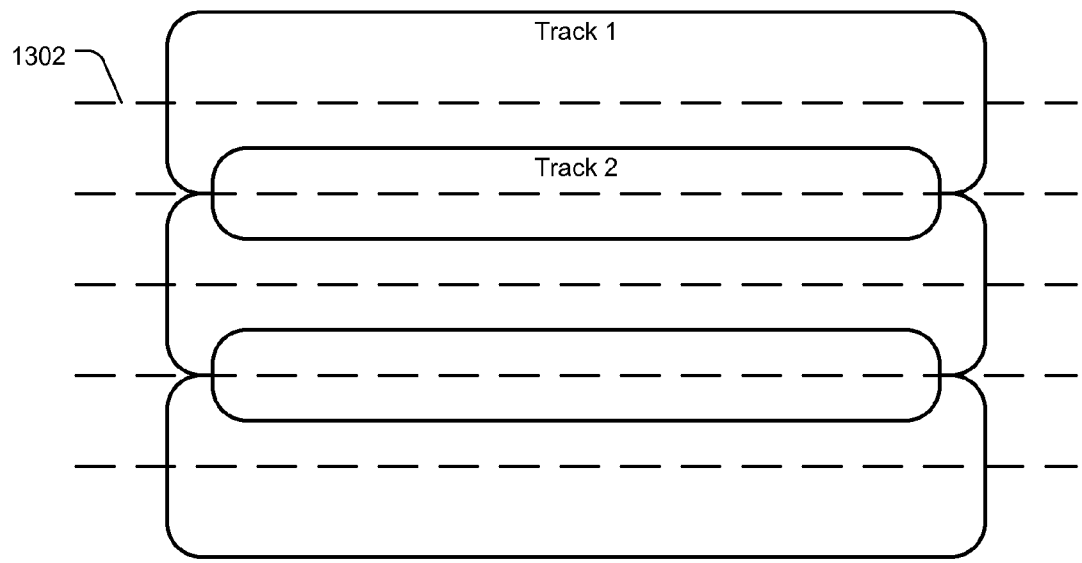
FIGS. 13A and 13B are a diagrams of a system configured to perform media certification with different recording widths, in accordance with certain embodiments of the present disclosure.
Figure 13B:
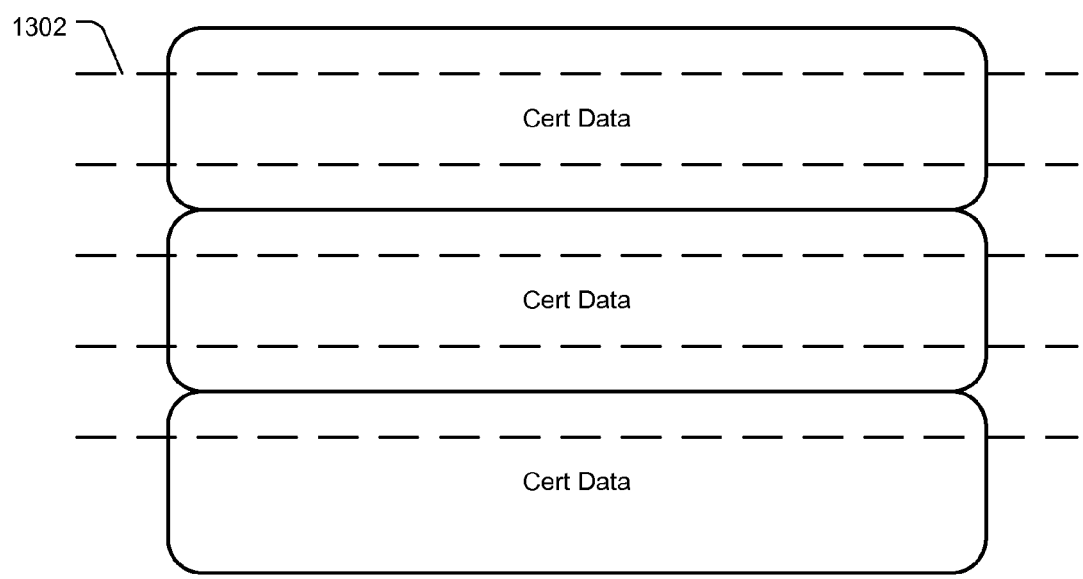

FIGS. 13A and 13B are a diagrams of a system configured to perform media certification with different recording widths, in accordance with certain embodiments of the present disclosure. FIG. 13A depicts a sequence of wide and narrow IMR tracks. Dashed lines 1302 may represent a center line of each track. Read and write heads may be centered over the center lines 1302 when reading from or writing the corresponding track. However, writing cert data may require centering a write head at an offset from the data track centers. For example, if cert data was recorded at the Track 1 recording width and centered on Track 1, the cert data may not be readable for Track 2, as Track 2 would only be partially written.

FIG. 13B depicts an example embodiment in which the wide track recording width is used to record the cert data. In the depicted embodiment, the wide recording width may be sufficient to record cert data to two data tracks. The write head may be centered in-between the track centers 1302 of two adjacent tracks when writing cert data, allowing the cert data to cover and be readable for both adjacent tracks. When performing read-verify operations on the cert data, the read head may follow the normal track centers 1302. In some embodiments, cert data may be recorded at three, four, or more times of a data track width, and the disc writer may be configured to position the write head so that the cert data is readable from each covered track. Other embodiments are also possible.

Figure 14:
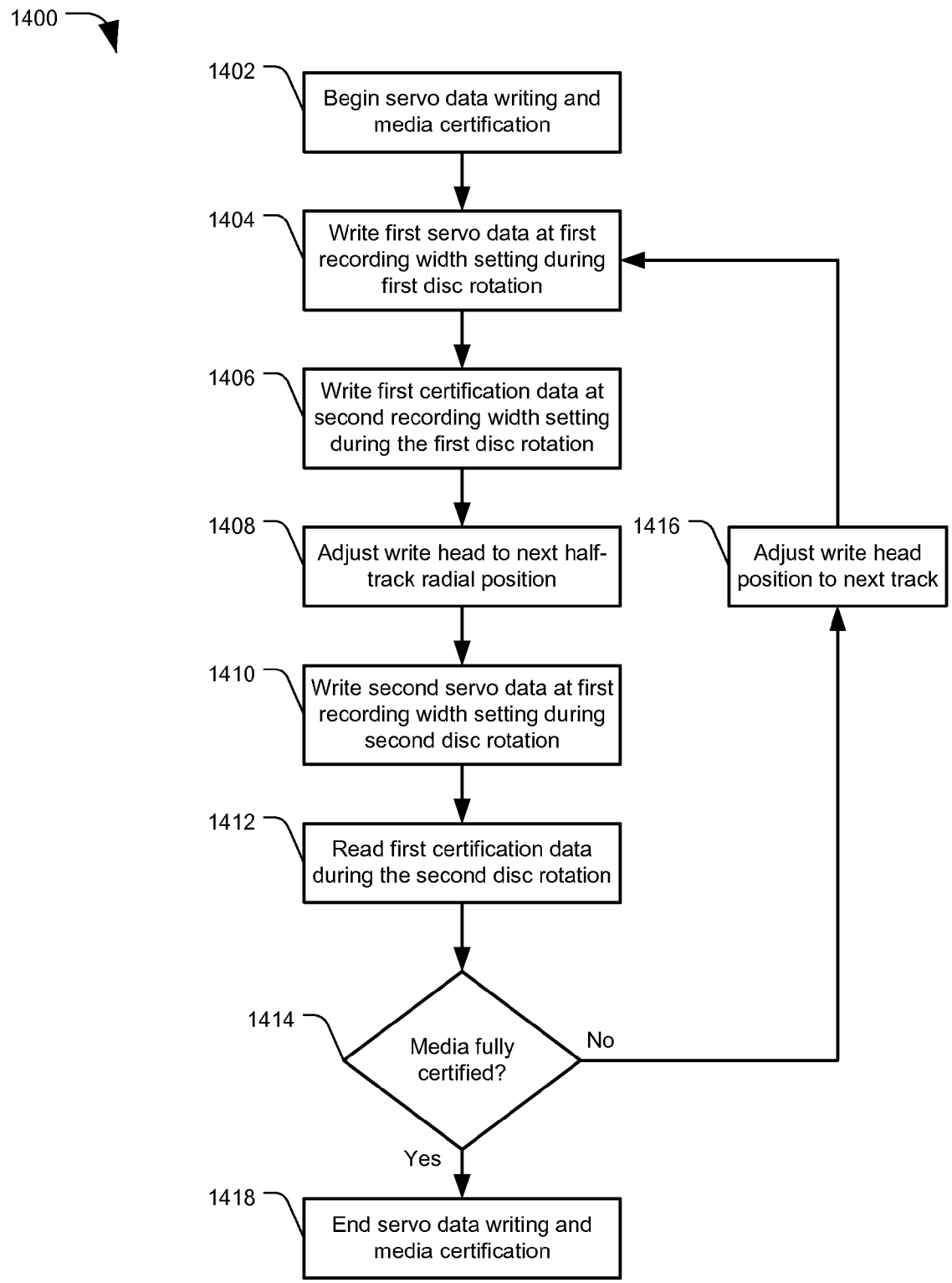
FIG. 14 is a flowchart of a method of media certification with different recording widths, in accordance with certain embodiments of the present disclosure.

FIG. 14 is a flowchart of a method 1400 of media certification with different recording widths, in accordance with certain embodiments of the present disclosure. The method 1400 may include beginning a servo data writing and media certification operation, at 1402. For example, one or more discs may be inserted into a disc writing device (e.g. a MDW or hard drive configured to perform in situ servo writing and media certification), and the device may be instructed to perform the described operations.

The method 1400 may include writing first servo data at a first recording width setting during a first disc rotation, at 1404. For example, servo data may be recorded at a half-track width, a quarter-track width, or at some other first recording width setting. The recording width may be selected by setting a laser current setting, by selecting a write head configured to record at a certain recording width, or using other methods.

The method 1400 may include writing first certification data at a second recording width setting during the first rotation, at 1406. In some embodiments, the second recording width may be wider than the first recording width. For example, the servo data may be recorded at a half-track width, while the cert data may be recorded at twice the width of a track. Again, the recording width may be selected based on laser current settings, head selection, or other methods.

In some embodiments, the method 1400 may include alternating between writing servo data at the first recording width and cert data at the second recording width during the first rotation. For example, the servo data may be recorded to the disc at regular intervals during a current disc rotation, and the cert data may be recorded to the disc in between the servo data sectors during the same rotation.

After recording the servo data and cert data during a first disc rotation, the method 1400 may include adjusting a position of the write head to a next half-track radial position. In some embodiments, the amount of distance the head is adjusted depends on a write width for the servo data. For example, if servo data is recorded at a ⅓ track width, the head may be adjusted by ⅓ of a track in a radial direction.

The method 1400 may include writing second servo data at the first recording width setting during a second disc rotation, at 1410. In some embodiments, servo data may be written at corresponding circumferential intervals on each disc rotation to create radial spoke servo patterns on the disc surface. However, rather than writing cert data during the second disc rotation, the method 1400 may include reading the previously-recorded first certification data during the second disc rotation, at 1412. For example, the disc writer device may deactivate write operations and activate a read head between servo sectors to read the recorded cert data. In some embodiments, the method may include performing read-verify operations on the read, including reading the cert data and comparing the read data to the expected pattern to determine the existence of errors. The errors may indicate bad areas on the storage medium. In some embodiments, the method 1400 may include previously-recorded cert data from a more distant track, and not the cert data recorded from the immediately-preceding rotation, or not from the immediately-adjacent half-track. Other embodiments are also possible.

The method 1400 may include determining whether the media has been fully certified, at 1414. For example, this may include determining whether certification data has been recorded to all tracks of the disc surface, and that the certification data has been read back to determine the existence of error zones on the disc. In some embodiments, the method 1400 may also include determining whether servo data has been recorded for all tracks of the disc. If the media has not been fully certified, at 1414, the method 1400 may include adjusting a position of the write head to the next successive track, at 1416, and continuing with servo writing and certification at 1404. If the media has been fully certified, at 1414, the method 1400 may include ending the servo data writing and media certification operation, at 1418. In some embodiments the method may conclude with determining whether the media includes too many bad areas and should be discarded, generating a list or table of detected error regions, performing other processes, or any combination thereof. In some embodiments, a drive may not assign sector addresses or otherwise use error regions for data storage.

Figure 15:
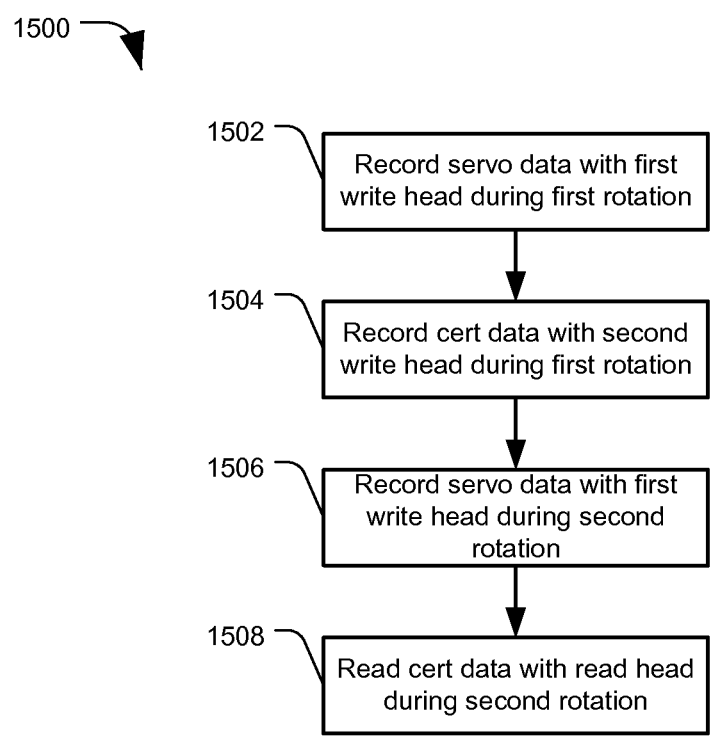
FIG. 15 is a flowchart of a method of media certification with different recording widths, in accordance with certain embodiments of the present disclosure.

FIG. 15 is a flowchart of a method 1500 of media certification with different recording widths, in accordance with certain embodiments of the present disclosure. The method 1500 may be directed to disc writer devices employing multiple write heads to record at different recording widths. In some embodiments, a disc writing device configured to perform the method 1500 may include a first write head to record data at a first recording width, a second write head to record data at a second recording width wider than the first recording width, and at least one read head to read recorded data.

The method 1500 may include recording servo data with a first write head on a first rotation of a disc storage medium, at 1502. The method 1500 may include recording cert data with a second write head on the first rotation at 1504, the second write head having a different recording width than the first write head. The method 1500 may include adjusting a radial position of at least the first write head over the disc surface, and recording servo data with the first write head during a second disc rotation, at 1506. The method 1500 may include reading previously recorded cert data (e.g. recorded during the first rotation) with a read head during the second rotation, at 1508. In some embodiments, the method 1500 may be repeated until the disc has been fully written with servo data and certified.

Figure 16:
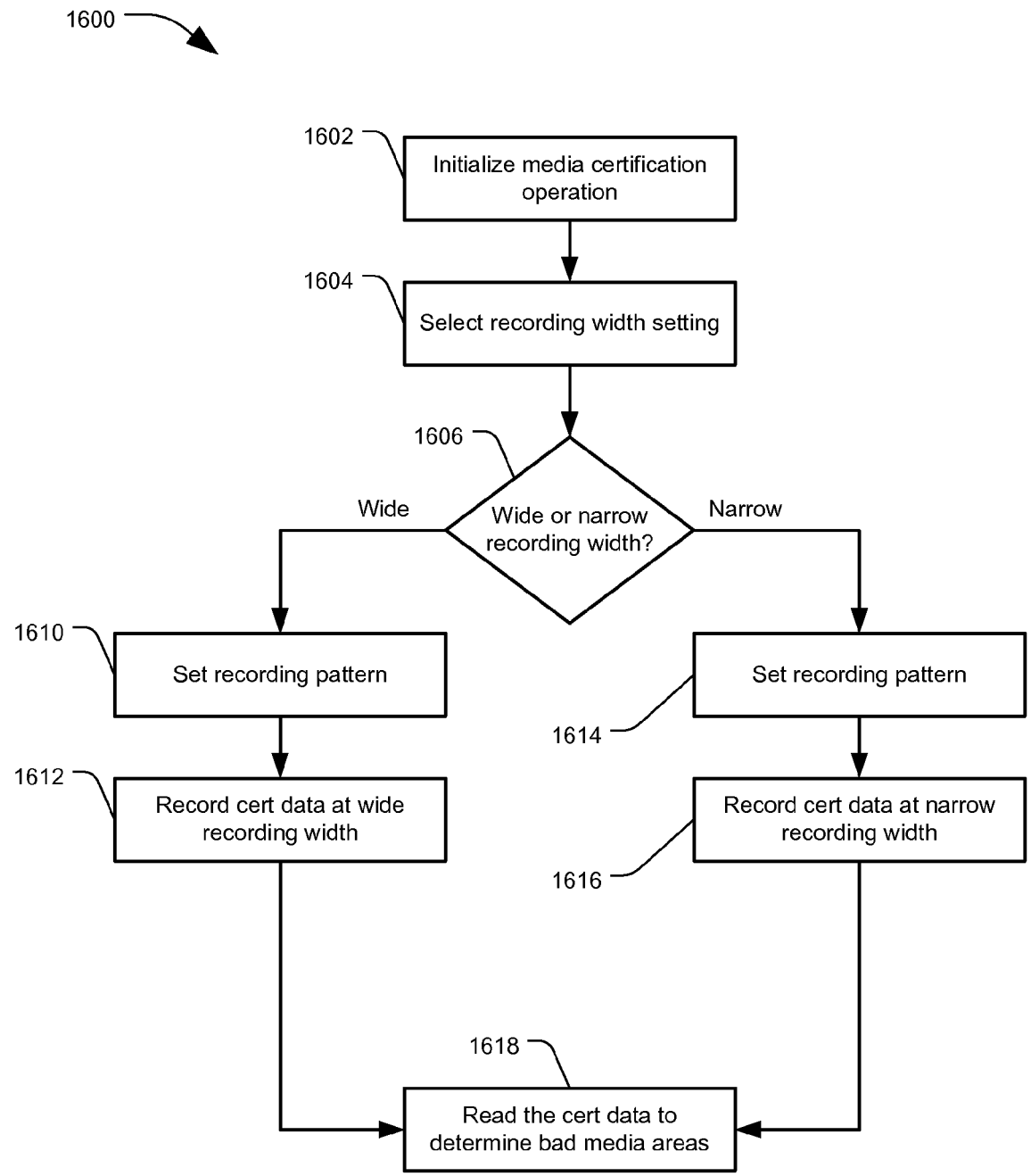
FIG. 16 is a flowchart of a method of media certification with different recording widths, in accordance with certain embodiments of the present disclosure.

FIG. 16 is a flowchart of a method 1600 of media certification with different recording widths, in accordance with certain embodiments of the present disclosure. The method 1600 may be directed to disc writer devices configured to record data at two or more recording widths. For example, the disc writer device may be configured to record data using a HAMR transducer with adjustable laser current settings, a disc writer device having multiple recording heads configured to record at different widths, other disc writer devices capable of recording at different widths, or any combination thereof.

Method 1600 may include initializing a media certification operation, at 1602. For example, a disc drive may be directed to write cert data to a disc preformatted with servo data installed into the drive, and to read the cert data back to determine the location and existence of bad areas.

Method 1600 may include selecting a recording width setting at which to write the cert data, at 1604. For example, a HAMR drive may be configured to record data using at least two different recording widths. For example, a drive configured to employ interlaced magnetic recording (IMR), the drive may be configured to record data at a wide recording width (for bottom or "fat" tracks that may be partially overlapped) or at a narrow recording width (for top or "skinny" tracks that may partially overlap the bottom tracks). In some embodiments, the laser current for a HAMR device may be variable, and not limited to preset width settings. For disc writer devices including two or more recording heads configured to record data at different widths, method 1600 may include selecting which recording head to use to write the cert data. Other embodiments are also possible.

In some embodiments, a recording width setting may be selected to implement a manufacturing or production guideline. For example, a narrow width may put minimal or no wear on a transducer, while a wide recording width may reduce testing times and accelerate production. Other embodiments are also possible.

Method 1600 may include determining whether the recording width is set to wide or narrow, at 1606. For example, a "narrow" recording width may correspond to a single data track width. In some embodiments, the data track width of an IMR device may correspond to the width of the narrow IMR tracks. The wide IMR tracks may be partially overwritten at the boundaries, thereby reducing the width of the wide tracks to a width similar to the narrow tracks. A "wide" recording width may refer to recording widths greater than the data track width of the drive. For example, a laser current setting may be increased to a HAMR near-field transducer (NFT) so that the recording width becomes equal to two times the data track width, five times the data track width, or some other recording width.

Method 1600 may include setting a recording pattern, at 1610. For example, different heads or laser currents may be optimized for different recording densities or patterns. For example, recording at a low linear density (bits per inch, BPI) may improve the signal-to-noise ratio (SNR) when writing at a narrow recording width. A 3 T recording pattern (e.g. the bit sequence 111000) may be used when writing cert data at a narrow recording width. A wide recording width may allow a higher linear density, and for example a 2 T (e.g. 1100) pattern may be used when writing cert data. Other embodiments are also possible.

In some embodiments, rather than or in addition to setting a linear recording density, setting a recording pattern may include setting an order in which to record data to the tracks. For example, cert data may be written to odd tracks, and the odd tracks may be verified. Cert data may then be written to even tracks, followed by verifying the even tracks. For example, recording data at high linear densities immediately adjacent to previously-written data may produce adjacent track interference (ATI) or similar interference from later-written tracks on the previously-written tracks. If a 2× track width recording width is used, pairs of tracks may be written simultaneously (e.g. tracks 1 and 2). Writing to tracks 3 and 4 may produce interference that may make track 2 difficult to read. Accordingly, the device may record track pairs 1 and 2, 5 and 6, 9 and 10, etc. first, and then those tracks may be read and verified. The device may then record track pairs 3 and 4, 7 and 8, etc. and verify those tracks. Other embodiments are also possible.

At 1612, the method 1600 may then include recording the cert data at the wide recording width selected at 1604, using the recording pattern selected at 1610. Method 1600 may include reading back the cert data to detect errors and determine bad areas of the recording medium. In some embodiments, a table or log of bad sectors may be created. A drive may consult the table during operation to avoid storing data to those bad sectors.

When a determination is made that a narrow recording width was selected, at 1606, the method 1600 may include setting a recording pattern, at 1614. Setting a recording pattern is discussed in regard to 1610. In some embodiments, setting a recording pattern may include selecting a recording data rate, a track recording pattern, or other settings. For example, when writing using the "top" or narrow recording width and data rate of IMR, alternating recording tracks may be advantageous. Narrower tracks are more prone to adjacent track interference causing reduced SNR, and therefore recording and verifying odd tracks first, then recording and verifying even tracks may reduce interference. Other embodiments are also possible. For example, a selected pattern may include performing three recording and verifying passes for every three tracks, e.g. tracks 1, 4, 7 . . . followed by tracks 2, 5, 8, etc. After selecting a recording pattern, the method 1600 may include recording cert data at the selected narrow recording width, at 1616, and reading the cert data to determine bad media areas, at 1618.

Steps of the methods described herein may be omitted or performed in other orders than as shown in the figures. For example, a specific recording pattern may not need to be selected for method 1600. In some embodiments, all cert data may not need to be recorded before reading back the cert data. For example, a media certification process may include writing cert data on a first pass, and reading the cert data on one or more subsequent disc rotations, followed by writing the next set of cert data, and so on. Other embodiments are also possible.

The servo writing and certification techniques described herein can be applied to improve production of a variety of storage formats. The techniques described can be employed by a HAMR disc writer devices, which may accelerate drive production using higher laser current settings, or reduce wear on the HAMR drive itself using lower laser current settings. Interlaced magnetic recording (IMR) devices may use different laser currents or multiple recording heads with different write widths to perform servo data writing and cert data writing. In drives configured for shingled magnetic recording (SMR), wide cert tracks can be recorded which cover the area of multiple shingled data tracks, without the need to write cert data to narrow overlapped tracks. Other embodiments are also possible.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. For example, servo and cert patterns may be recorded in a single spiral write operation rather than in writes to individual discrete tracks, halftracks, etc. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
   writing servo data at a first recording width with a multi-disc writer, servo data including data used by a servo control system to control a position of a recording head;
   writing first certification data at a second recording width different than the first recording width with the multi-disc writer, certification data including a bit pattern read to determine one or more locations of bad areas on a storage medium;
   installing the storage medium into a data storage device configured to record data at multiple recording widths; and
   selecting a third recording width from the multiple recording widths to record second certification data with the data storage device.

2. The method of claim 1 further comprising:
   writing the servo data at the first recording width during a first rotation of the storage medium;
   recording the first certification data at the second recording width during the first rotation; and
   reading the first certification data during a second rotation of the storage medium.

3. The method of claim 1 further comprising:
   at least one of the multi-disc writer and the data storage device include a laser emitter employed during writing operations; and
   adjusting a laser current of the laser emitter to select a recording width.

4. The method of claim 3 further comprising:
   the data storage device is configured to employ an interlaced magnetic recording (IMR) writing scheme, including:
      writing a first set of tracks at a wide recording width;
      writing a second set of tracks at a narrow recording width, a track from the second set of tracks partially overlapping two tracks from the first set of tracks; and
   selecting the third recording width from the wide recording width and the narrow recording width.

5. The method of claim 1 further comprising determining a delay period to delay writing certification data after a recording head passes a servo data area in which servo data is written, the delay period based on a recording width used to record the certification data.

6. The method of claim 1 further comprising:
   performing a variable bit aspect ratio (VBAR) test on the storage medium at the data storage device;
   determining locations of data tracks and data sectors on the storage medium based on the VBAR test;
   reading the second certification data to determine the one or more locations of bad areas on the storage medium; and
   generating a list of bad sectors based on the locations of the bad areas and the locations of the data sectors.

7. The method of claim 6 further comprising selecting the third recording width is wide enough to record multiple data tracks during a single rotation of the storage medium.

8. The method of claim 1 further comprising:
   at least one of the multi-disc writer and the data storage device include two or more write heads configured to record data at different recording widths; and
   selecting a recording width includes selecting a write head with a corresponding recording width.

9. A system comprising:
   a multi-disc writer apparatus configured to:
      write servo data using a first recording width during a first rotation of a storage medium, servo data including data used by a servo control system to control a position of a recording head;
      write first certification data during the first rotation using a second recording width different than the first recording width, certification data including a bit pattern to determine one or more locations of bad areas on the storage medium; and read the first certification data during a second rotation of the storage medium.

10. The system of claim 9 further comprising:

the multi-disc writer including a head having:
- a read element;
- a write element; and
- a laser emitter configured to heat a surface of the storage medium during write operations to change the magnetic properties of the storage medium.

11. The system of claim 10, further comprising:

the multi-disc writer further configured to:
- generate a laser current to control an intensity of a laser generated by the laser emitter, the intensity of the laser determining a recording width;
- apply a first laser current setting to generate the first recording width; and
- apply a second laser current setting to generate the second recording width.

12. The system of claim 9 further comprising a data storage device into which the storage medium is installed after servo data is written to the storage medium by the multi-disc writer, the data storage device configured to record data at multiple recording widths.

13. The system of claim 12 further comprising:

the data storage device further configured to:
- perform storage density capability testing on the storage medium to determine data track and data sector locations on the storage medium;
- record second certification data to the storage medium at a third recording width selected from the multiple recording widths;
- read the second certification data to detect errors; and
- determine the location of bad sectors on the storage medium based on the data track and data sector locations and the detected errors.

14. The system of claim 13 further comprising:

the third recording width is equal to or greater than a width of two adjacent data tracks; and the data storage device further configured to position a recording head while recording the second certification data so that at least two data tracks are written by the second certification data.

15. The system of claim 12 further comprising at least one of the multi-disc writer and the data storage device include a first recording head and a second recording head positioned to write to a first surface of the recording medium, the first recording head and the second recording head configured to record data at different recording widths.

16. A system comprising:

a data storage device including a laser emitter configured to heat a surface of a storage medium during write operations to change magnetic properties of the storage medium, the data storage device configured to:
- generate a laser current to control an intensity of a laser generated by the laser emitter, the intensity of the laser determining a recording width;
- record data to the storage medium at a plurality of selectable recording widths;
- record first certification data to the storage medium at a first recording width, certification data including a bit pattern to determine one or more locations of bad areas on the storage medium,
  - the first recording width selected based on performance parameters, including:
    - selecting a narrow recording width to reduce wear on the data storage device; and
    - selecting a wide recording width to reduce certification test time.

17. The system of claim 16 further comprising:

the data storage device is configured to employ an interlaced magnetic recording (IMR) writing scheme, including:
- writing a first set of tracks at a wide recording width;
- writing a second set of tracks at a narrow recording width, a track from the second set of tracks partially overlapping two tracks from the first set of tracks; and the first recording width is selected from the wide recording width and the narrow recording width.

18. The system of claim 16 further comprising:

a multi-disc writer apparatus configured to:
- write first servo data to the storage medium prior to installation of the storage medium in the data storage device, writing the first servo data including using a second recording width during a first rotation of the storage medium, servo data including data used by a servo control system to control a position of a recording head; and
- write second certification data during the first rotation using a third recording width different than the second recording width.

19. The system of claim 18 further comprising:

the multi-disc writer further configured to:
- adjust a radial position of a recording element over the storage medium after the first rotation;
- record second servo data during a second rotation of the storage medium; and
- read the second certification data during the second rotation of the storage medium.

* * * * *